(12) United States Patent
Chan

(10) Patent No.: US 11,345,010 B2
(45) Date of Patent: May 31, 2022

(54) OUTDOOR SURFACE TREATING APPARATUS AND ASSOCIATED ACCESSORY TOOL ASSEMBLY

(71) Applicant: TTI (MACAO COMMERCIAL OFFSHORE) LIMITED, Macao (CN)

(72) Inventor: Wai Tong Chan, Kwai Chung (HK)

(73) Assignee: Techtronic Cordless GP, Anderson, SC (US)

( * ) Notice: Subject to any disclaimer, the term of this patent is extended or adjusted under 35 U.S.C. 154(b) by 23 days.

(21) Appl. No.: 16/516,915

(22) Filed: Jul. 19, 2019

(65) Prior Publication Data

US 2020/0030958 A1 Jan. 30, 2020

(30) Foreign Application Priority Data

Jul. 25, 2018 (EP) .................................... 18185596

(51) Int. Cl.
*B25F 1/02* (2006.01)
*A01G 3/06* (2006.01)
(Continued)

(52) U.S. Cl.
CPC ................ *B25F 1/02* (2013.01); *A01G 3/062* (2013.01); *B25F 5/02* (2013.01); *E01H 1/056* (2013.01); *A01D 34/90* (2013.01); *A47L 9/244* (2013.01)

(58) Field of Classification Search
CPC .. B25F 1/02; A01G 3/062; E01H 5/09; A01D 34/90; A01D 34/82; A01D 34/902; A01D 34/824; A47L 9/244
(Continued)

(56) References Cited

U.S. PATENT DOCUMENTS 1,969,805 A   8/1934   Lang
2,014,626 A   9/1935   Moorhead
(Continued)

FOREIGN PATENT DOCUMENTS

AU   2003302669 B2   6/2010
CA      2955813 A1   1/2016
(Continued)

OTHER PUBLICATIONS

Office Action dated Mar. 16, 2020 from corresponding AU Patent Application No. 2019203789 (2 pages).

*Primary Examiner* — Monica S Carter
*Assistant Examiner* — Katina N. Henson
(74) *Attorney, Agent, or Firm* — Dority & Manning, P.A.

(57) ABSTRACT

An outdoor surface treating apparatus having a body having a handle and a head arranged to be removably connected with an accessory tool assembly. The head includes a first engagement arrangement for releasably engaging with a second engagement arrangement in the accessory tool assembly. A drive unit, arranged in the head, includes a first coupling member for drivingly coupling with a second coupling member in the accessory tool assembly. The first engagement arrangement is fixed. The second engagement arrangement is movable between an extended position and a retracted position. The accessory tool assembly includes a biasing element for biasing the second engagement arrangement into the extended position. As the accessory tool assembly is aligned with the head, in particular when the first engagement arrangement is aligned with the second engagement arrangement, and is moved along a movement axis into engagement with the head, the second engagement arrangement first moves over the first engagement arrangement against the bias then returns to the extended position and locks with the first engagement arrangement while the (Continued)

first coupling member couples with the second coupling member.

20 Claims, 12 Drawing Sheets

(51) Int. Cl.
*B25F 5/02* (2006.01)
*E01H 1/05* (2006.01)
*A47L 9/24* (2006.01)
*A01D 34/90* (2006.01)

(58) Field of Classification Search
USPC .............................. 15/105; 37/246, 257, 403
See application file for complete search history.

(56) References Cited

U.S. PATENT DOCUMENTS

| | | | |
|---|---|---|---|
| 2,842,788 | A | 7/1958 | Rench |
| 3,186,019 | A | 6/1965 | Ryosuke |
| 4,276,674 | A | 7/1981 | Hunt |
| 5,924,154 | A | 7/1999 | Gockel |
| 6,052,976 | A | 4/2000 | Cellini |
| 6,293,349 | B1 | 9/2001 | Marshall |
| 6,321,405 | B1 | 11/2001 | Whittaker |
| D457,403 | S | 5/2002 | Cooper |
| 6,508,004 | B2 | 1/2003 | Tezuka |
| 6,659,188 | B2 | 12/2003 | Takemoto |
| 6,688,404 | B2 | 2/2004 | Uhl |
| 7,096,966 | B2 | 8/2006 | Eberhardt |
| 7,257,909 | B2 | 8/2007 | Shaffer |
| 7,665,171 | B2 | 2/2010 | Lexander |
| 7,886,399 | B2 | 2/2011 | Dayton |
| 7,913,345 | B2 | 3/2011 | Dayton |
| 8,122,554 | B2 | 2/2012 | Schemmel |
| 8,156,596 | B2 | 4/2012 | Rose |
| 8,176,989 | B1 | 5/2012 | Ponomarenko |
| 8,186,135 | B2 | 5/2012 | Leonardi |
| D690,063 | S | 9/2013 | Kent |
| 9,095,098 | B2 | 8/2015 | Guenther |
| 9,451,857 | B2 | 9/2016 | Stein |
| 9,636,817 | B2 | 5/2017 | Mclain |
| 9,750,386 | B2 | 9/2017 | Zeng |
| 9,763,512 | B1 | 9/2017 | Jones |
| 9,801,516 | B2 | 10/2017 | Zheng |
| 9,885,195 | B1 | 2/2018 | Hayes |
| 9,920,546 | B2 | 3/2018 | Van Der |
| 10,517,385 | B2 | 12/2019 | Kress |
| 2004/0216904 | A1 | 11/2004 | Eberhardt |
| 2005/0241837 | A1 | 11/2005 | Notaras |
| 2006/0124324 | A1 | 6/2006 | Neusink |
| 2008/0030083 | A1 | 2/2008 | Mueller-Boysen |
| 2008/0060149 | A1* | 3/2008 | Wu ..................... A46B 5/0095 15/29 |
| 2008/0098553 | A1 | 5/2008 | Dayton |
| 2008/0104780 | A1 | 5/2008 | Dayton |
| 2009/0249658 | A1* | 10/2009 | Embry ..................... E01H 5/04 37/246 |
| 2014/0332243 | A1* | 11/2014 | Baskar ..................... B25F 3/00 173/29 |
| 2016/0227694 | A1 | 8/2016 | Bermudez |
| 2017/0055793 | A1 | 3/2017 | Zhu |
| 2017/0297190 | A1 | 10/2017 | Rampton |
| 2018/0035608 | A1 | 2/2018 | Rethaber |
| 2018/0084731 | A1 | 3/2018 | Harris |
| 2018/0104809 | A1 | 4/2018 | Dyer |
| 2018/0146773 | A1* | 5/2018 | Kress ..................... A47L 11/24 |
| 2020/0030958 | A1 | 1/2020 | Chan |

FOREIGN PATENT DOCUMENTS

| | | |
|---|---|---|
| CA | 2928328 C | 10/2020 |
| CN | 1619060 | 5/2005 |
| CN | 303217773 S | 5/2015 |
| CN | 104612097 B | 4/2016 |
| CN | 206448232 U | 8/2017 |
| CN | 206482216 U | 9/2017 |
| CN | 107550409 A | 1/2018 |
| CN | 108338494 A | 7/2018 |
| CN | 108354311 A | 8/2018 |
| CN | 108851492 A | 11/2018 |
| CN | 208081169 U | 11/2018 |
| DE | 3100904 C2 | 6/1986 |
| DE | 9000712 U1 | 3/1990 |
| DE | 2225626 Y | 4/1996 |
| DE | 19538474 C1 | 3/1997 |
| DE | 202004018358 U1 | 1/2005 |
| DE | 202004018358 U1 | 1/2005 |
| DE | 102008006318 B3 | 5/2009 |
| DE | 202010007482 | 6/2011 |
| DE | 102011002978 B4 | 8/2012 |
| DE | 9002359 B1 | 4/2015 |
| DE | 202016103486 U1 | 8/2016 |
| DE | 202019102533 U1 | 5/2019 |
| DE | 102018102964 A1 | 8/2019 |
| EP | 0118315 A3 | 6/1986 |
| EP | 0208688 A1 | 1/1987 |
| EP | 0346796 A3 | 8/1990 |
| EP | 1616473 A1 | 1/2006 |
| EP | 1558407 B1 | 10/2010 |
| EP | 2482692 B1 | 12/2016 |
| EP | 3586607 A1 | 1/2020 |
| EP | 3287061 B1 | 4/2020 |
| FR | 3041500 B1 | 2/2018 |
| GB | 842383 A | 7/1960 |
| GB | 2483148 B | 9/2015 |
| WO | WO2017198618 A1 | 11/2017 |

* cited by examiner

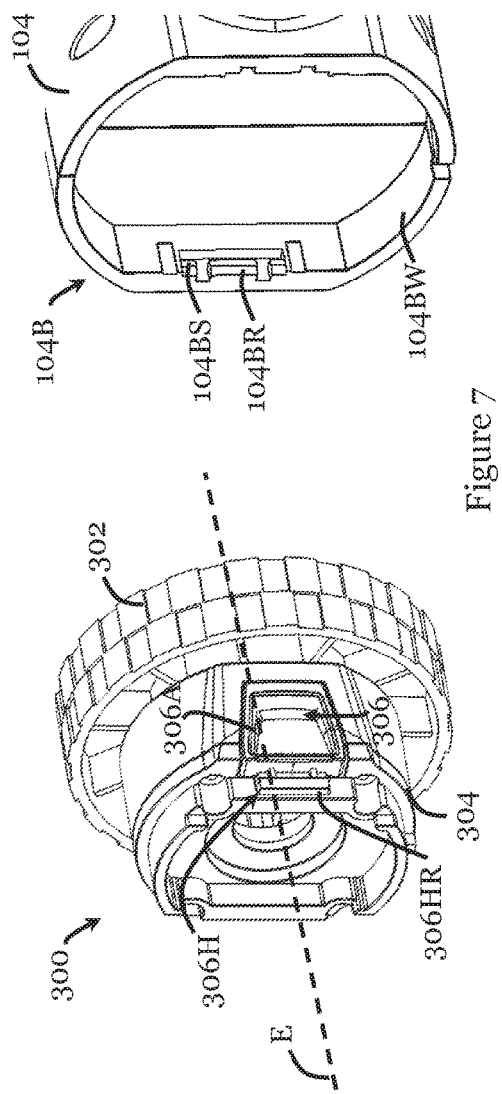
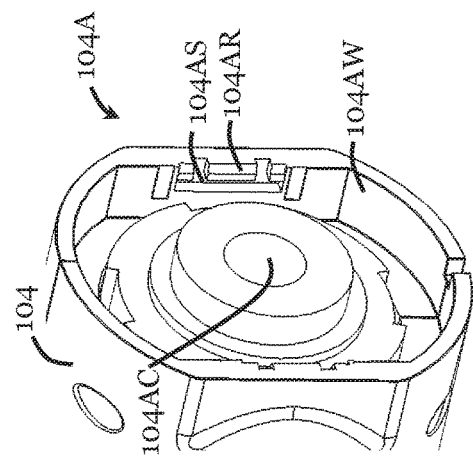
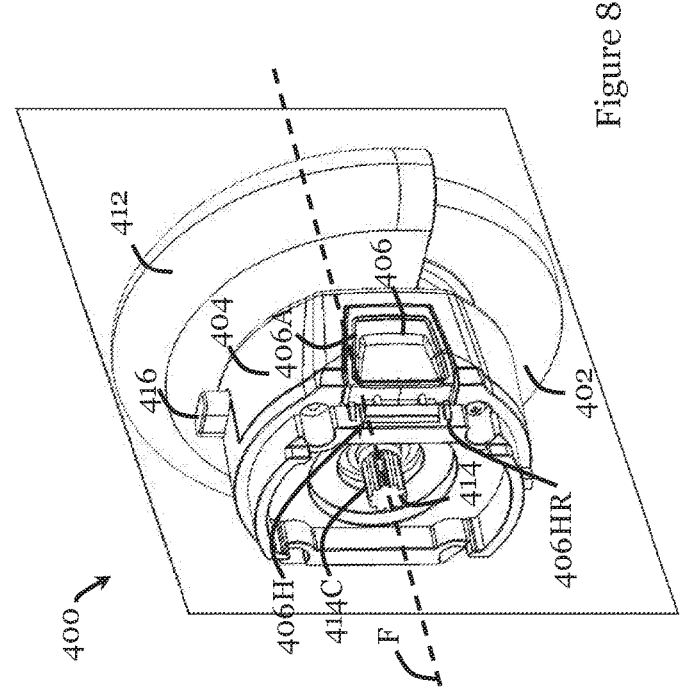
Figure 7
Figure 8

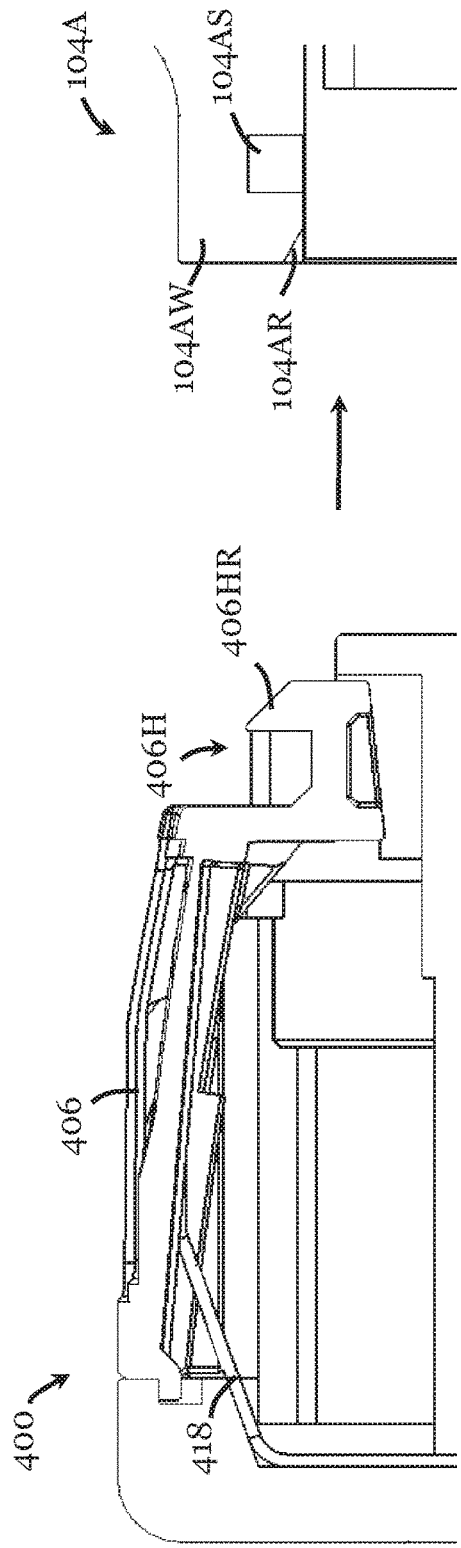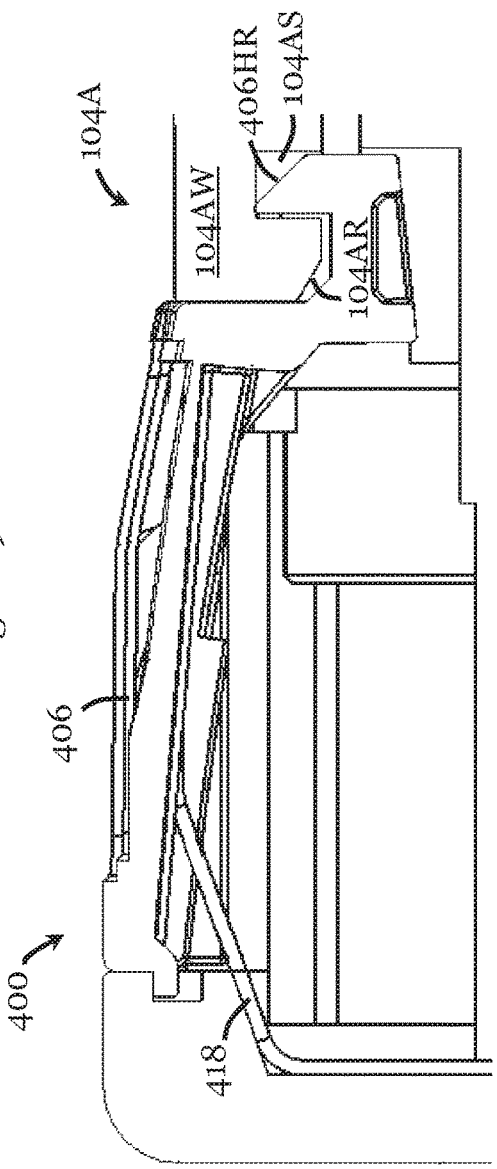
Figure 9
Figure 10

OUTDOOR SURFACE TREATING APPARATUS AND ASSOCIATED ACCESSORY TOOL ASSEMBLY

The present application claims the benefit of priority to European Patent Application No. EP18185596.6, filed on Jul. 25, 2018, the disclosure of which is incorporated by reference herein in its entirety.

TECHNICAL FIELD

The invention relates to an outdoor surface treating apparatus and its associated accessory tool assembly.

BACKGROUND

Outdoor surface treating apparatus is a specific class of outdoor products designed to treat outdoor surfaces, such as patio or paver surfaces and joints, which are more rugged and less delicate than indoor surfaces. These outdoor surfaces and joints are usually soiled with stubborn dirt, weed, and grease that are harder to remove than dirt on indoor surfaces.

Manually operated paver push brooms and electric pressure washers are examples of conventional outdoor surface treating apparatuses. A paver push broom generally includes a fixed brush with stiff bristles arranged at an end of a broom stick. Dirt on the surfaces can be removed by scrubbing the surface with the bristles, optionally with cleaning solution or powder applied to the outdoor surface to be cleaned. A pressure washer, on the other hand, generally includes a nozzle that directs pressurized liquid to the surface to dislodge dirk and grease from the surface. These conventional outdoor surface treating apparatuses are usually dedicated outdoor apparatuses adapted for only a single outdoor cleaning operation. These apparatuses are not readily convertible for different surface treatment applications, and could be difficult to assembly, disassemble, clean, repair, and maintain.

Some recently-developed outdoor surface treating apparatuses include replaceable cleaning modules that can be changed to adapt the apparatus for different treatment operations. However, some of these replacement mechanisms require the use of another tool to attach and detach the cleaning module. The other replacement mechanisms are operable without using a tool but require the user to rest the apparatus on the floor before using one hand to move the cleaning module and another hand to actuate a locking/unlocking member on the apparatus. In either case, the operation for installing and uninstalling the cleaning module is time-consuming, cumbersome, and inconvenient to the user.

SUMMARY OF THE INVENTION

It is an object of the invention to address the above needs, to overcome or substantially ameliorate the above disadvantages or, more generally, to provide an outdoor surface treating apparatus and associated accessory tool assembly with improved ease of use and maintenance.

In accordance with a first aspect of the invention, there is provided an outdoor surface treating apparatus, comprising: a body having a handle and a head arranged to be removably connected with an accessory tool assembly, the head including a first engagement arrangement for releasably engaging with a second engagement arrangement in the accessory tool assembly; and a drive unit arranged in the head, the drive unit including a first coupling member for drivingly coupling with a second coupling member in the accessory tool assembly; wherein the first engagement arrangement is fixed; wherein the second engagement arrangement is movable between an extended position and a retracted position and the accessory tool assembly includes a biasing element for biasing the second engagement arrangement into the extended position; wherein as the accessory tool assembly is aligned with the head, in particular when the first engagement arrangement is aligned with the second engagement arrangement, and is moved along a movement axis into engagement with the head, the second engagement arrangement first moves over the first engagement arrangement against the bias then returns to the extended position and locks with the first engagement arrangement while the first coupling member couples with the second coupling member. The outdoor surface treating apparatus is adapted for moving along and treating patio or paver surfaces, including their joints and edges, formed by stone (natural or artificial), concrete, wood, tiles, or the like.

In one embodiment of the first aspect, the outdoor surface treating apparatus further includes the accessory tool assembly.

In one embodiment of the first aspect, the head includes a long axis generally parallel to the movement axis; and the first engagement arrangement is arranged at a lateral end portion of the head.

In one example, first engagement arrangement is arranged at a lateral end portion of the head and another first engagement arrangement is arranged at another lateral end portion of the head.

In one embodiment of the first aspect, the second engagement arrangement is movable radially (need not strictly) with respect to the movement axis between the extended position and the retracted position.

The spring member may be a spring plate, a compression spring, or the like. The first engagement arrangement may include at least one recess defined by a wall part in a lateral end portion of the head and the second engagement arrangement may include a corresponding hook member arranged to be received in the recess.

Preferably, the first engagement arrangement includes two recesses defined in a lateral end portion of the head and the second engagement arrangement includes two corresponding hook members arranged to be received in the respective recess.

More preferably, the two recesses are diametrically opposed and the two corresponding hook members are correspondingly diametrically opposed.

In a preferred embodiment, at least one of a front end of the wall part and a front end the hook member includes a ramp surface to facilitate radial movement of the hook member relative to the wall part as the accessory tool assembly is aligned with the head, in particular when the first engagement arrangement is aligned with the second engagement arrangement, and is moved along the movement axis into engagement with the head.

The ramp surface may be straight or curved.

Preferably, the hook member is actuable by the user to move the hook member into the retracted position to release the engagement of the recess and the hook member.

In another embodiment of the first aspect, the second engagement arrangement is rotatable between the extended position and the retracted position.

The biasing element can be a spring plate, a compression spring, a torsion spring, a resilient rubber member, etc.

The first engagement arrangement may include a stud formed or arranged on a wall part in a lateral end portion of the head and the second engagement arrangement may include a corresponding hook member arranged to engage with the stud.

Preferably, the first engagement arrangement includes two studs formed or arranged on a lateral end portion of the head and the second engagement arrangement includes two corresponding hook members arranged to engage with the respective stud.

The stud may be extending radially with respect to the movement axis.

More preferably, the two studs are diametrically opposed and the two corresponding hook members are correspondingly diametrically opposed.

In a preferred embodiment, a front end of the hook member includes a ramp surface to facilitate rotation of the hook member relative to the stud as the accessory tool assembly is aligned with the head and is moved along the movement axis into engagement with the head.

The ramp surface may be straight or curved.

Optionally, the accessory tool assembly further includes a user-actuable release member operably coupled with the hook member, the user-actuable release member is arranged to be actuated to rotate the hook member into the retracted position to release the engagement of the stud and the hook member.

The user-actuable release member may be rotatable by the user to release the engagement of the stud and the hook member.

The user-actuable release member may be a rotatable button, a slide button, or the like.

In one embodiment of the first aspect, the accessory tool assembly includes any of: a wheel assembly with a wheel arranged to support movement of the outdoor surface treating apparatus; a roller assembly having a roller with (stiff) bristles arranged to be driven by the drive unit (to treat the outdoor surface); an edge cutter assembly with an edge cutter, e.g., a blade or a cutting disc, arranged to be driven by the drive unit (to treat the outdoor surface); and an edge brush assembly with an edge brush, e.g., a wire brush, arranged to be driven by the drive unit (to treat the outdoor surface).

The wheel of the wheel assembly may be arranged to be driven by the drive unit to facilitate movement of the outdoor surface treating apparatus.

The roller assembly can include two separate parts each arranged to be connected with a respective lateral end portion of the head.

In one example, the outdoor surface treating apparatus includes two accessory tool assemblies, a wheel assembly connected at one lateral end portion of the head and an edge brush or edge cutter assembly connected at another lateral end portion of the head.

In one embodiment of the first aspect, the handle includes a generally rearwardly extending hand grip portion and a base arranged at a rear end of the hand grip portion, and a battery receptacle for receiving a battery pack is arranged at the base.

The battery pack is preferably a rechargeable battery pack of Lithium chemistry.

In one embodiment of the first aspect, the body further includes an elongated tube assembly connecting the handle with the head. Preferably, the elongated tube assembly is telescopic, e.g., formed by inner and outer tubes that are relatively movable.

In one embodiment of the first aspect, the body further includes an auxiliary handle connected to the elongated tube assembly at a position between the handle and the head.

Preferably, the auxiliary handle is rotatable with respect to the elongated tube assembly about a rotation axis substantially transverse to a longitudinal axis of the elongated tube assembly.

A locking mechanism may be provided for locking a rotation angle of the auxiliary handle with respect to the elongated tube assembly.

In accordance with a second aspect of the invention, there is provided an accessory toot assembly for an outdoor surface treating apparatus, comprising: a first coupling member for drivingly coupling with a tool element and a second coupling member of a drive unit of the outdoor surface treating apparatus so as to drivingly couple the tool element with the drive unit; a first engagement arrangement for releasably engaging with a second engagement arrangement in the head; wherein the first engagement arrangement is movable between an extended position and a retracted position and the accessory tool assembly includes a biasing element for biasing the first engagement arrangement into the extended position; wherein the second engagement arrangement is fixed; wherein as the accessory tool assembly is aligned with the head, in particular when the first engagement arrangement is aligned with the second engagement arrangement, and is moved along a movement axis into engagement with the head, the first engagement arrangement first moves over the second engagement arrangement against the bias then returns to the extended position and locks with the second engagement arrangement while the first coupling member couples with the second coupling member.

In one embodiment of the second aspect, the first engagement arrangement is movable radially with respect to the movement axis between the extended position and the retracted position.

The biasing element can be a spring plate, a compression spring, a resilient rubber member etc. The first engagement arrangement may include a hook member; and the second engagement arrangement may include a recess defined by a wall part in a lateral end portion of the head for receiving the hook member.

In one embodiment, the first engagement arrangement includes two hook members; and the second engagement arrangement includes two corresponding recesses defined by respective wall part in a lateral end portion of the head for receiving the respective hook member.

Preferably, the two hook members are diametrically opposed and the two corresponding recesses are correspondingly diametrically opposed.

Preferably, at least one of a front end of the wall part and a front end the hook member includes a ramp surface to facilitate radial movement of the hook member relative to the wall part as the accessory tool assembly is aligned with the head and is moved along the movement axis into engagement with the head.

The ramp surface may be straight or curved. The hook member may be actuable by the user to move into the retracted position to release the engagement of the recess and the hook member.

In another embodiment of the second aspect, the first engagement arrangement is rotatable between the extended position and the retracted position.

The biasing element can be a spring plate, a compression spring, a torsion spring, a resilient rubber member, etc.

The first engagement arrangement may include a hook member; and the second engagement arrangement includes a corresponding stud formed or arranged on a wall part in a lateral end portion of the head for engaging with the hook member.

Preferably, the first engagement arrangement includes two hook members; and the second engagement arrangement includes two corresponding studs each formed or arranged on a respective wall part in a lateral end portion of the head for engaging with the respective hook member.

The stud may be extending radially with respect to the movement axis. Preferably, the two hook members are diametrically opposed and the two corresponding studs are correspondingly diametrically opposed.

In one embodiment, a front end of the hook member includes a ramp surface to facilitate rotation of the hook member relative to the stud as the accessory tool assembly is aligned with the head and is moved along the movement axis into engagement with the head.

The ramp surface may be straight or curved.

Optionally, the accessory tool assembly further includes a user-actuable release member operably coupled with the hook member, the user-actuable release member is arranged to be actuated to rotate the hook member into the retracted position to release the engagement of the stud and the hook member.

The user-actuable release member may be a rotatable button, a slide button, or the like.

In one embodiment of the second aspect, the accessory tool assembly further includes the tool element.

In one embodiment of the second aspect, the accessory tool assembly includes any of: a wheel assembly with a wheel arranged to support movement of the outdoor surface treating apparatus; a roller assembly having a roller with (stiff) bristles arranged to be driven by the drive unit (to treat the outdoor surface); an edge cutter assembly with an edge cutter, e.g., a blade or cutting disc, arranged to be driven by the drive unit (to treat the outdoor surface); and an edge brush assembly with an edge brush, e.g., a wire brush, arranged to be driven by the drive unit (to treat the outdoor surface).

The wheel of the wheel assembly may be arranged to be driven by the drive unit to facilitate movement of the outdoor surface treating apparatus.

The roller assembly can include two separate parts each arranged to be connected with a respective lateral end portion of the head.

In one embodiment of the second aspect, the accessory tool assembly is the accessory tool assembly of the first aspect.

In accordance with a third aspect of the invention, there is provided an accessory tool assembly for an outdoor surface treating apparatus, comprising: a first coupling member for drivingly coupling with a tool element and a second coupling member of a drive unit of the outdoor surface treating apparatus so as to drivingly couple the tool element with the drive unit; and a housing for receiving the first coupling member, the housing includes an axially extending mounting neck portion with an axial end face and an outer wall defining a thickness along an axial direction; wherein the mounting neck portion is arranged to removably engage with a guard for the tool element; wherein the guard includes a resilient wall part defining a mouth for receiving the mounting neck portion, the mouth having a width smaller than a width defined by the outer wall of the mounting fleck portion such that when the guard is inserted onto the mounting neck portion along a direction generally transverse to the axial direction, the mouth expands and the resilient wall part clamps onto the mounting neck portion.

In one embodiment of the third aspect, the accessory tool assembly further includes the guard.

Preferably, the width of the mounting opening is 60% to 99% of the width of the mounting neck portion.

In one embodiment of the third aspect, the outer wall has a groove for receiving a locking member of the guard.

In a preferred embodiment, the outer wall has a circumferential portion with an array of grooves arranged thereon for receiving a locking member of the guard. The number of grooves in the array can be, for example, between 2 to 30.

Preferably, the guard is rotatably adjustable with respect to the mounting neck portion when mounted to the mounting neck portion.

In one embodiment of the third aspect, the locking member is arranged to move from engagement with one groove to engagement with another groove when the guard is rotated relative to the mounting neck portion.

In one embodiment of the third aspect, the locking member includes a nub formed on a resilient arm of the guard. Preferably, the resilient arm is integral to the guard. The resilience may be provided by the material of the guard itself, or may be provided a weakened part (e.g., cut-out) formed on the guard.

Preferably, the entire guard is integrally formed.

In one embodiment of the third aspect, the accessory tool assembly includes any of: a roller assembly with a roller arranged to be driven by the drive unit to treat the outdoor surface; an edge cutter assembly with an edge cutter arranged to be driven by the drive unit to treat the outdoor surface; and an edge brush assembly with an edge brush arranged to be driven by the drive unit to treat the outdoor surface.

In one embodiment of the third aspect, the accessory tool assembly is that of the first or second aspect.

In accordance with a fourth aspect of the invention, there is provided a guard for an accessory tool assembly for an outdoor surface treating apparatus, comprising: a body including a resilient wall part defining a mouth for receiving an axially extending mounting neck portion of a housing of the accessory tool assembly, the axially extending mounting neck portion having an axial end face and an outer wall defining a thickness along an axial direction; wherein the mouth includes a width smaller than a width defined by the outer wall of the mounting neck portion such that when the guard is inserted onto the mounting neck portion along a direction generally transverse to the axial direction, the mouth expands and the resilient wall part clamps onto the mounting neck portion.

Preferably, the width of the mounting opening is 60% to 99% of the width of the mounting neck portion.

In one embodiment of the fourth aspect, the guard further includes a locking member arranged to be received in a groove formed on the outer wall. Preferably, the locking member is arranged to be received in an array of grooves formed on the outer wall.

Preferably, the guard is rotatably adjustable with respect to the mounting neck portion when mounted to the mounting neck portion.

In one embodiment, the locking member is arranged to move from engagement with one groove to engagement with another groove when the guard is rotated relative to the mounting neck portion.

In one embodiment of the fourth aspect, the locking member includes a nub formed on a resilient arm of the guard. Preferably, the resilient arm is integral to the guard.

The resilience may be provided by the material of the guard itself, or may be provided a weakened part (e.g., cut-out) formed on the guard.

Preferably, the entire guard is integrally formed.

In one embodiment of the fourth aspect, the accessory tool assembly includes any of: a roller assembly with a roller arranged to be driven by the drive unit (to treat the outdoor surface); an edge cutter assembly with an edge cutter arranged to be driven by the drive unit (to treat the outdoor surface); and an edge brush assembly with an edge brush arranged to be driven by the drive unit (to treat the outdoor surface).

In one embodiment of the fourth aspect, the accessory tool assembly is that of the first, second, or third aspect.

BRIEF DESCRIPTION OF THE DRAWINGS

Embodiments of the invention will now be described, by way of example, with reference to the accompanying drawings in which:

FIG. 7 is a perspective view of the wheel assembly of FIG. 4 and the corresponding lateral end portion of the head of the outdoor surface treating apparatus of FIG. 4;

FIG. 8 is a perspective view of the edge brush assembly of FIG. 4 and the corresponding lateral end portion of the head of the outdoor surface treating apparatus of FIG. 4;

FIG. 9 is a sectional view showing the engagement arrangement of the edge brush assembly of FIG. 4 and the corresponding engagement arrangement of the head of the outdoor surface treating apparatus of FIG. 4, before engagement;

FIG. 10 is a sectional view showing the engagement arrangement of the edge brush assembly of FIG. 4 and the corresponding engagement arrangement of the head of the outdoor surface treating apparatus of FIG. 4, after engagement;

DETAILED DESCRIPTION OF THE PREFERRED EMBODIMENT

Figure 3:
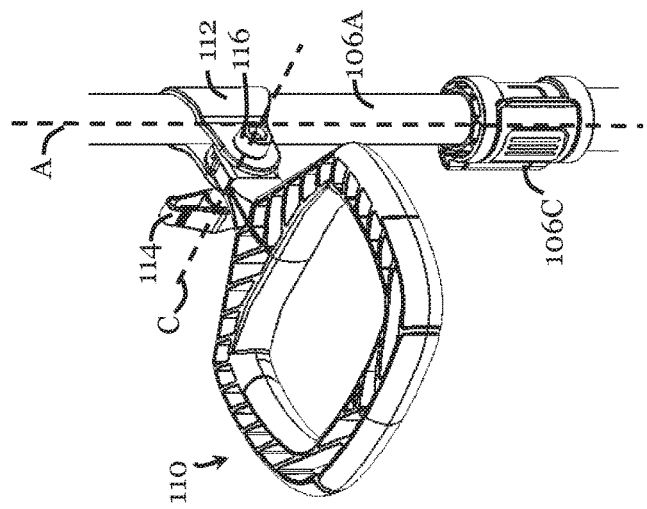
FIG. 3 is a perspective view of the auxiliary handle and the telescopic adjustment mechanism of the outdoor surface treating apparatus of FIG. 1.
Figure 2:
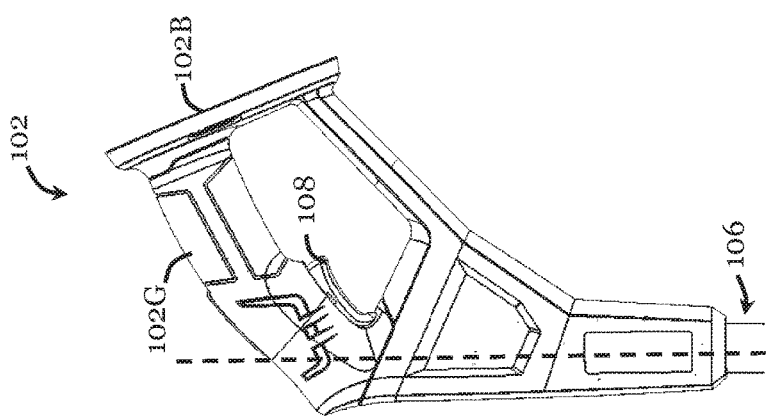
FIG. 2 is a side view of the handle of the outdoor surface treating apparatus of FIG. 1.
Figure 1:
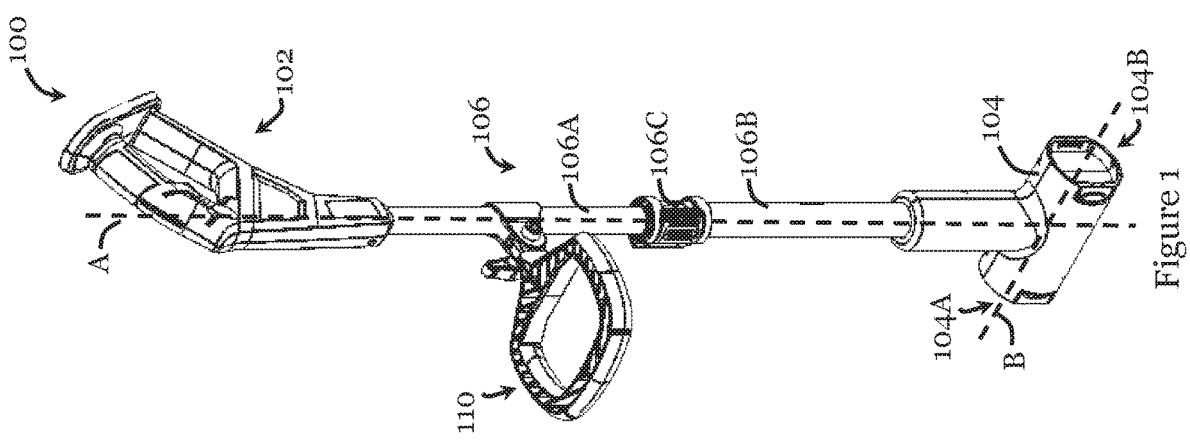
FIG. 1 is a perspective view of an outdoor surface treating apparatus without any accessory tool assembly and power source in one embodiment of the invention.

Referring to FIGS. 1 to 3, there is shown an outdoor surface treating apparatus 100 in one embodiment of the invention. The apparatus too includes a body with a handle 102 at the top end and a power head 104 at bottom end. An elongated tube assembly 106 is arranged between the handle 102 and the power head 104. The elongated tube assembly 106 defines a longitudinal axis A along which the apparatus 100 generally extends. The elongated tube assembly 106 is formed by an inner tube 106A and an outer tube 106B in slidable arrangement, with an adjustment cuff 106C therebetween for locking the inner and outer tubes 106A, 106B with respect to each other. In other words, the elongated tube assembly 106 is a telescopic tube assembly, the length of which can be adjusted to suit the height of different users.

In this embodiment, the head 104 includes a long axis B that extends generally horizontally and perpendicular to the longitudinal axis A of the tube assembly 106. A drive unit including a motor and gear transmission is arranged inside the head 104. The motor is arranged with a shaft oriented generally horizontally. The head 104 includes two lateral end portions 104A, 104B each arranged to be coupled with an accessory tool assembly. Each of the end portion 104A, 104B includes an engagement arrangement for releasably engaging with the corresponding engagement arrangement of the accessory tool assembly. One of the lateral end portions 104A further allows for mechanical coupling between the drive unit in the head 104 and the attached accessory tool assembly. That lateral end portion 104A includes a coupling member arranged to couple with the corresponding coupling member of the accessory tool assembly.

As shown in FIGS. 1 and 2, the handle 102 includes a hand grip portion 102G that extends generally rearwardly with respect to the elongated tube assembly 106 and the head 104. The hand grip portion 102G includes a trigger 108, like a pistol grip handle. The base part of the hand grip portion 102G, i.e., the rear-most end of the handle 102, includes a base 102B with a battery receptacle for receiving a battery pack. Electrical connections are arranged inside the handle 102, the tube assembly 106, and the head 104, for electrically connecting the battery pack with the motor in the power head 104. The base part 102B defines a plane that is generally angled with respect to a vertical plane. Actuating the trigger 108 in the handle 102 would activate the drive unit in the head 104 and hence the accessory tool assembly coupled with the drive unit.

As shown in FIGS. 1 and 3, an auxiliary handle 110 is mounted to the elongated tube assembly 106 at a position between the adjustment cuff 106C and the handle 102. The auxiliary handle 110 is mounted to the elongated tube assembly 106 using a U shaped coupler 112 that surrounds the tube 106A and defines a mouth for receiving a coupling part of the auxiliary handle 110. The U shaped coupler 112 and the coupling part of the auxiliary handle 110 include correspondingly aligned through-openings through which a knob 114 extends. A nut 116 is used to tighten the mouth of the U shaped coupler 112 to clamp onto and secure the auxiliary handle 110. The auxiliary handle 110 is rotatable with respect to the elongated tube assembly 106 about a rotation axis C (defined by the knob) substantially transverse to the longitudinal axis A of the elongated tube assembly 106.

Figure 5:
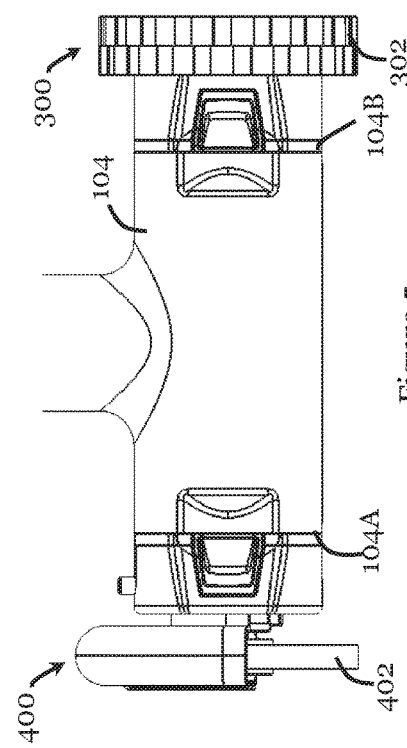
FIG. 5 is a front view of the base part of the outdoor surface treating apparatus of FIG. 4.
Figure 6:
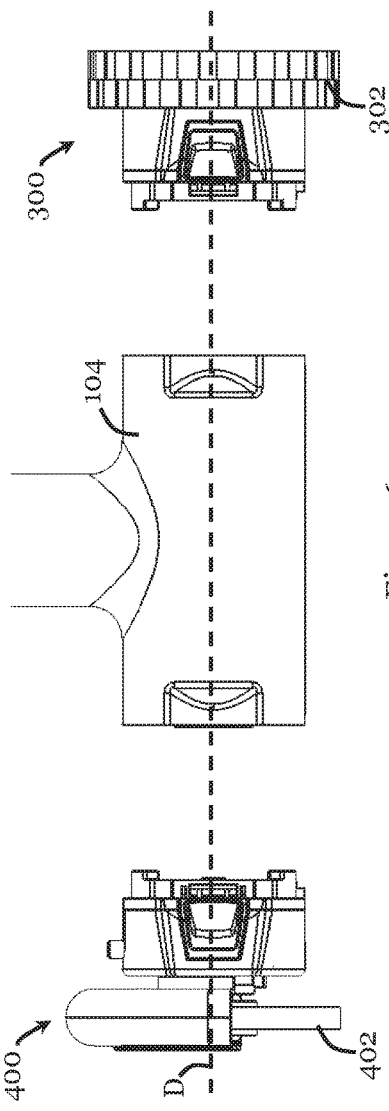
FIG. 6 is an exploded view of the base part of the outdoor surface treating apparatus of FIG. 4.
Figure 4:
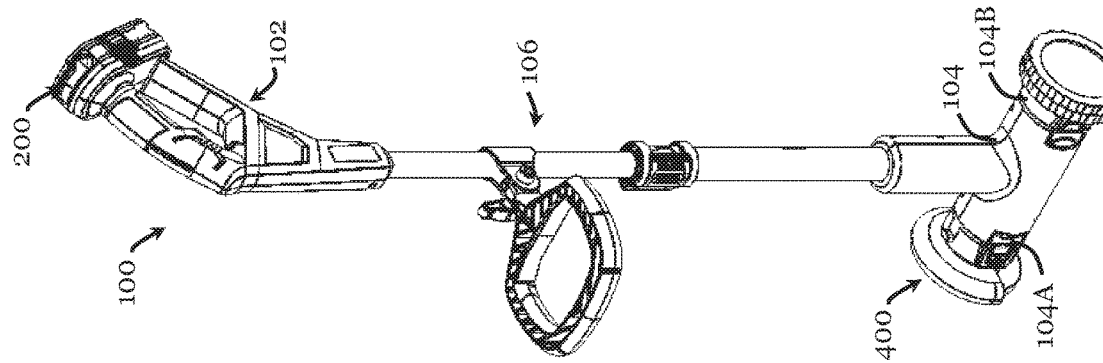
FIG. 4 is a perspective view of the outdoor surface treating apparatus of FIG. 1 in the first configuration (attached with a wheel assembly, an edge brush assembly, and a battery pack) in one embodiment of the invention.

FIGS. 4 to 6 show the outdoor surface treating apparatus too of FIG. 1 with a battery pack 200 attached to the battery receptacle on the base 102B of the handle 102, a wheel assembly 300 attached to one lateral end portion 104B of the head 104 and an edge brush assembly 400 attached to another lateral end portion 104A of the head 104. As viewed from the front of the apparatus 100 as shown in FIGS. 5 and 6, the edge brush assembly 400 is coupled to the left end of the head 104 and the wheel assembly 300 is coupled to the right end of the head 104. To connect the edge brush assembly 400 to the head 104, the user simply aligns the corresponding engagement features on the head 104 and the edge brush assembly 400, and then moves the edge brush assembly 400 or the head 104 relatively towards each other along the movement axis D. In this embodiment, the movement axis D is generally horizontal. To disconnect the edge brush assembly 400 from the head 104, the user simply disengages the engagement features on the head 104 and the edge brush assembly 400, then moves the edge brush assembly 400 or the head 104 relatively away from each other again along the movement axis D. In this embodiment, the drive unit in the head 104 is arranged to couple with the edge brush 402 in the edge brush assembly 400 to drive the edge brush 402. The wheel assembly 300 can be mounted similarly, but from the other side of the head 104, and without driving connection between the wheel 302 and the drive unit in the head 104.

FIG. 7 shows the wheel assembly 300 of FIG. 4 and the corresponding lateral end portion 104B of the head 104. Only the major components will be described. The wheel assembly 300 includes a housing 304 supporting a shaft, and a wheel 302 mounted on the shaft at one end of the housing 304 for rotation about an axis E. In this embodiment, the axis E is generally horizontal. The housing 304 has a generally obround shape. Two diametrically opposed spring-biased actuators 306 of like form are arranged on the housing 304, in particular on the relatively straight part of the obround housing 304. The actuators 306 are movable radially between an extended position as biased by the spring and a retracted position when the bias of the spring is overcome by a force applied, for example, by the user. Each actuator 306 includes an actuation portion 306A and a hook portion 306H near the axial end opposite the wheel 302. The to hook portion 306H includes a ramp surface 306HR with a linear ramp extending along an axis at an acute angle to the rotation axis E of the wheel 302. The lateral end portion 104B of the head 104 corresponding to the wheel assembly 300 includes also a housing with a corresponding obround shape defined by a wall 104BW. On the straight portions of the obround wall, two diametrically opposed recesses 104BS of like form are provided. These recesses 104BS are arranged to receive the hook portion 306H of the respective actuators 306 on the wheel assembly 300. Each of the wall part defining the recess 104BS includes, at an opening end, a ramp surface 104BR complementary to the ramp surface 306HR of the hook portion 306H.

The recesses 104BS on the head 104 and the hook portions 306H of the actuators 306 together provide engagement arrangements for releasably engaging the wheel assembly 300 to the head 104. In this embodiment, the wheel 302 is an idle wheel not arranged to couple with any drive units. The ramp surfaces 306HR provided on the hook portions 306H of the actuators 306 and the corresponding wall parts 104BR and recesses 104BS on the head 104 facilitate radial movement of the hook portions 306H relative to the wall of the head 104 as the wheel assembly 300 is aligned with the head 104 (the hook portions 306H aligned with the respective recess 104BS and its wall part 104BR) and moved along the movement axis (FIG. 6) into engagement with the head 104. The force of movement along the movement axis can be translated into a force that overcomes the biasing force exerted on the hook portions 306H by the spring. In other words, the hook portions 306H first move over the wall part 104BR of the head 104, against the bias of the spring, then returns to the extended position and enters the recess 104BS to lock with the head 104. To release the engagement between the wheel assembly 300 and the head 104, the user can simply pushes on the actuator 306 to move the hook portions 306H out of the recesses 104BS, then pulls the wheel assembly 300 and the head 104 relatively away from each other.

FIG. 8 shows the edge brush assembly 400 of FIG. 4 and the corresponding lateral end portion 104A of the head 104. The engagement mechanism between the edge brush assembly 400 and the corresponding lateral end portion 104A of the head 104 is somewhat similar to that described with reference to the wheel assembly 300 of FIG. 7. The main difference is that in this embodiment, the edge brush assembly 400 includes a disc-like edge brush 402, e.g., a wire brush, mounted on a spindle 414 and at one end of the housing 404 of the edge brush assembly 400 for rotation about an axis F of the spindle 414. A guard 412 partly covering the edge brush 402 is attached to the housing 404. A spindle lock actuator 416 is provided on the housing 404 for actuating a spindle lock mechanism arranged in the housing 404. At an end of the spindle 414 opposite the edge brush 402, there is a coupling part 414C for coupling with a corresponding coupling part 104AC (which couples with the drive unit) of the head 104. The coupling parts 104AC, 414C have corresponding engagement features for allowing transfer of torque from the drive unit to the spindle 414 and hence to the edge brush 402 to drive the edge brush 402 into rotation. The shape of the housing 404 and the general construction of the actuators 406 are like those of FIG. 7 and so will not be repeated. The lateral end portion 104A of the head 104 corresponding to the edge brush assembly 400 is similar to the portion 104B that corresponds to the wheel assembly 300, except that this portion 104A further includes a coupling member 104AC for drivingly coupling with the coupling part 414C of the spindle 414 to transfer torque.

In this embodiment, the recesses 104AS on the head 104 and the hook portions 406H of the actuators 406 together provide engagement arrangements for releasably engaging the edge brush assembly 400 to the head 104. In this embodiment, the edge brush assembly 400 has a coupling part 414C on the spindle 414 for coupling with the coupling part 104AC and hence the drive unit in the head 104. The ramp surfaces provided on the hook portions 406HR of the actuators 406 and the corresponding wall parts 104AR and recesses 104AS on the head 104 facilitate radial movement of the hook portions 406HR relative to the wall of the head 104 as the edge brush assembly 400 is aligned with the head 104 (the hook portions 406H aligned with the respective recess 104AS and its wall part 104AR) and moved along the movement axis (FIG. 6) into engagement with the head 104. The force of movement along the movement axis can be translated into a force that overcomes the biasing force exerted by the spring on the hook portions 406H. In other words, the hook portions 406H first moves over the wall part 104AR of the head 104, against the bias of the spring, then returns to the extended position and enters the recess 104AS to lock with the head 104. As locking occurs, the driving coupling between the spindle 414 and the coupling member 104AC of the head 104 (and hence the drive unit of the head) completes. To release the engagement between the edge brush assembly 400 and the head 104, the user can simply pushes on the actuator 406 to move the hook portions 406H out of the recesses 104AS, then pulls the edge brush assembly 400 and the head 104 relatively away from each other.

FIGS. 9 and 10 more specifically show the spring biased actuators 406 of the edge brush assembly 400 and the corresponding lateral end portion 104A of the head 104, before and after engagement. As shown in FIG. 9, the actuator is biased radially outwardly by a spring plate 418. The actuator 406 includes at the engagement edge, a hook portion 406H having a ramp surface 406HR. The ramp of the ramp surface 406HR extends along an axis at an acute angle to the movement axis (the axis for engaging the edge brush assembly 400 and the head 104, shown in FIG. 6). A corresponding ramp surface 104AR is formed on the engagement edge of the head 104. The recess 104AS for receiving the hook portion 406H is defined by a wall part of the head 104. As the edge brush assembly 400 moves towards and abuts the engagement end of the head 104, the ramp surfaces 406HR, 104AR slides over each other and simultaneously biases the hook portion 406H and hence the actuator 406 radially inwardly against the biasing force exerted by the spring plate 418. The hook portion 406H continues to move along the wall surface of the head 104 adjacent the ramp surface 104AR, then, upon reaching the recess 104AS, enters into the recess 104AS due to the biasing force exerted by the spring plate 418. In this way the hook portion 406H and hence the actuator 406 is engaged with the head 104. The engagement mechanism provided between the wheel assembly 300 and the head 104 operates similarly.

Figure 12:
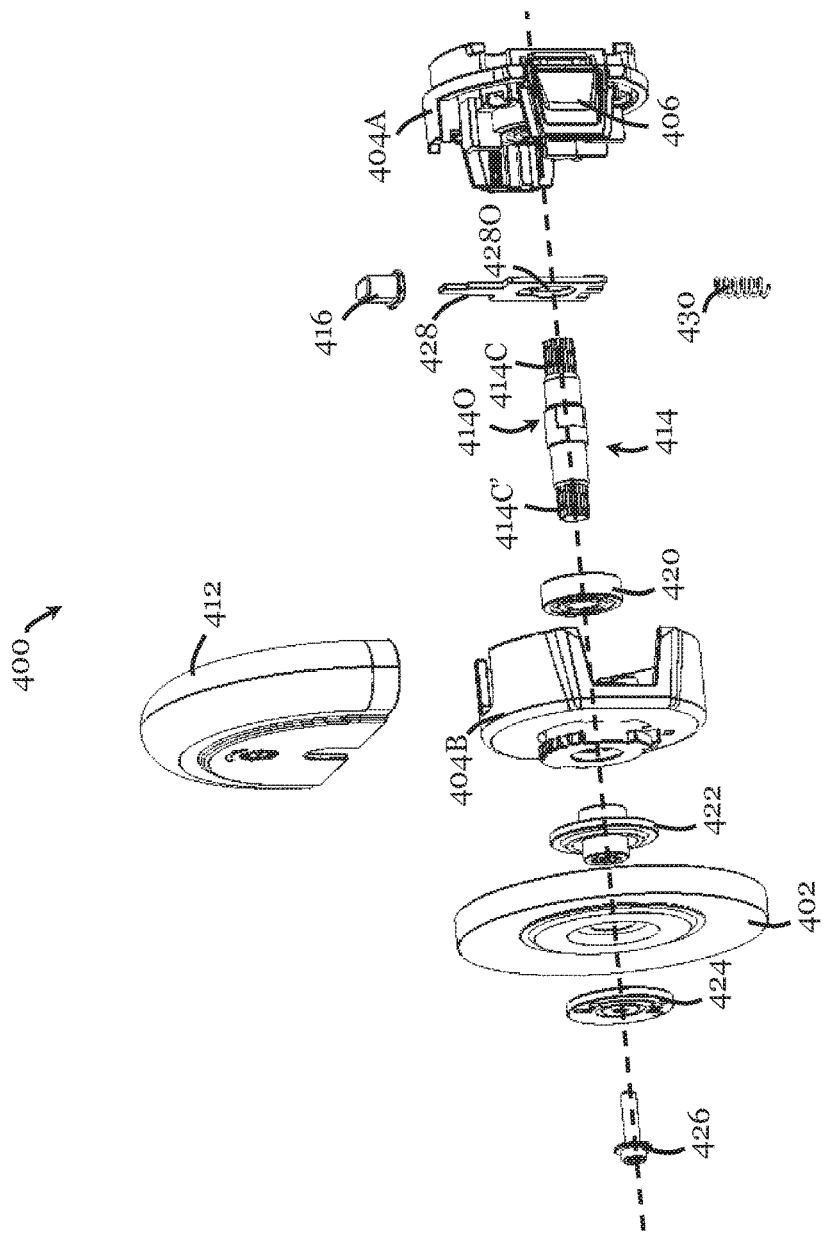
FIG. 12 is an exploded view of the edge brush assembly of FIG. 8.
Figure 11:
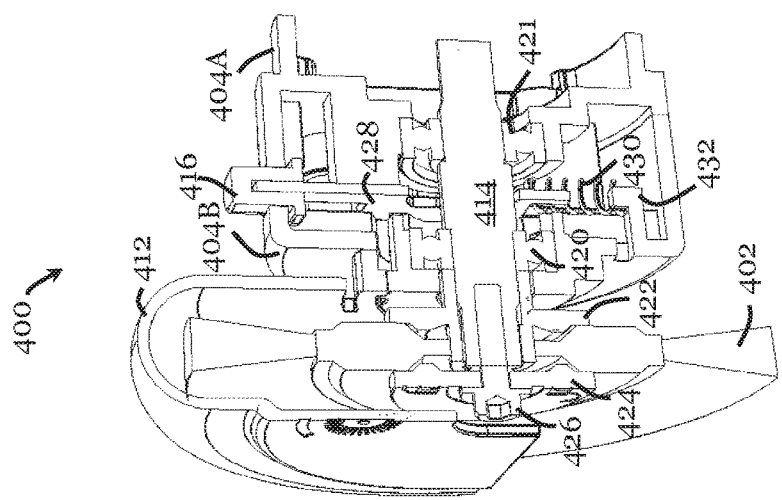
FIG. 11 is a sectional view of the edge brush assembly of FIG. 8 through the plane in FIG. 8.

FIGS. 11 and 12 illustrate, in more detail, the construction of the edge brush assembly 400. As shown in these Figures, the edge brush assembly includes a housing 404 formed by two housing parts 404A, 404B, one 404A for mounting the actuator 406 and another 404B for mounting the edge brush 402. A guard or cover 412 for the edge brush 402 is attached to the housing part 404B to which the edge brush 402 mounts. The two housing parts 404A, 404B define aligned through-holes through which the spindle 414 extends. Bearings 420, 421 are provided in the housing 404 for supporting rotation of the spindle 414 about the axis F. The spindle 414 extends generally parallel to the movement axis (FIG. 6), and includes at both ends, keyed surfaces 414C, 414C'. One end 414C of the spindle 414 away from the edge brush 402 is for coupling with a corresponding coupling part in the head 104. The other end 414C' of the spindle 414 is for coupling with an edge brush support sleeve 422 (an inner flange). This end 414C' of the spindle 414 also defines an opening for removably (e.g., threaded receiving a hex key head 426. The spindle 414 is generally long and cylindrical, but has a portion 414O with opposed flat surfaces defining an obround cross section. The disc-like edge brush 402 is arranged to be mounted on an axially extending cylindrical part of the support sleeve 422. An outer disc member 424 (outer flange) is arranged on the opposite side of the edge brush 402. The hex key head 426 rotatably supports the edge brush 402 between the inner and outer flanges 422, 424. A spindle locking mechanism is arranged in the housing 404. The spindle locking mechanism is formed by a spindle lock button 416 protruding from the housing 404, a spindle lock plate 428 biased by a compression spring 430 supported by a supporting flange 432 in the housing part 404B. The spindle lock plate 428 defines an opening 428O with an upper portion and a lower portion of different sizes. The upper portion is sized to correspond to (e.g., slightly larger than) the short axis of the obround portion 414O and is smaller than the long axis of the obround portion 414O, while the lower portion is sized to correspond to the long axis of the obround portion 414O (also the diameter of the remaining cylindrical portion). The spindle lock assembly is used for facilitating replacement or removal of the edge brush 402. To remove the edge brush 402, the user has to actuate the spindle lock actuator 416, depress it such that the upper portion of the opening on the spindle lock plate surrounds the obround portion 414O. In this way, the spindle 414 cannot rotate as the upper portion of the opening 428O is sized smaller than a long axis of the obround portion 414O. When the actuator 416 is actuated, the user can use a hex key to engage with and rotate the hex key head 426, to release the hex key head 426 from the spindle 414, thereby removing or replacing the edge brush 402, or the inner and outer flanges 422, 424, if needed.

Figure 14:
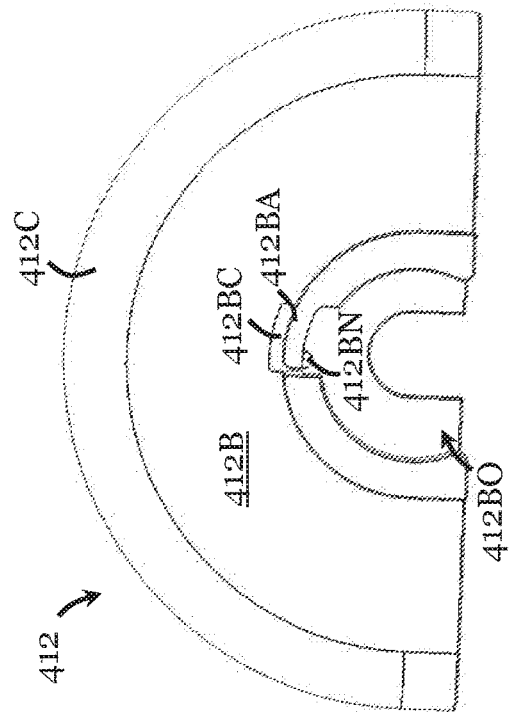
FIG. 14 is a side view of the blade guard of FIG. 13.
Figure 15:
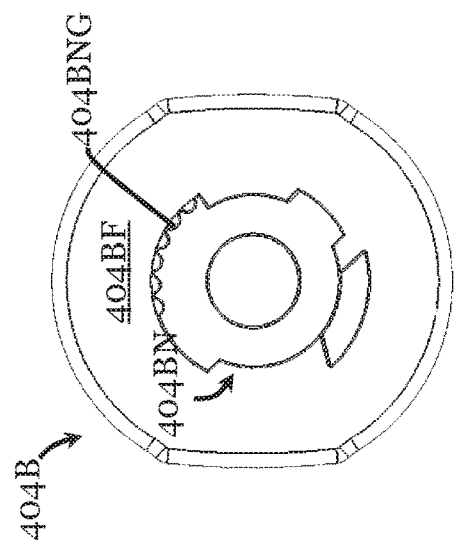
FIG. 15 is a side view of the housing part of FIG. 13.
Figure 13:
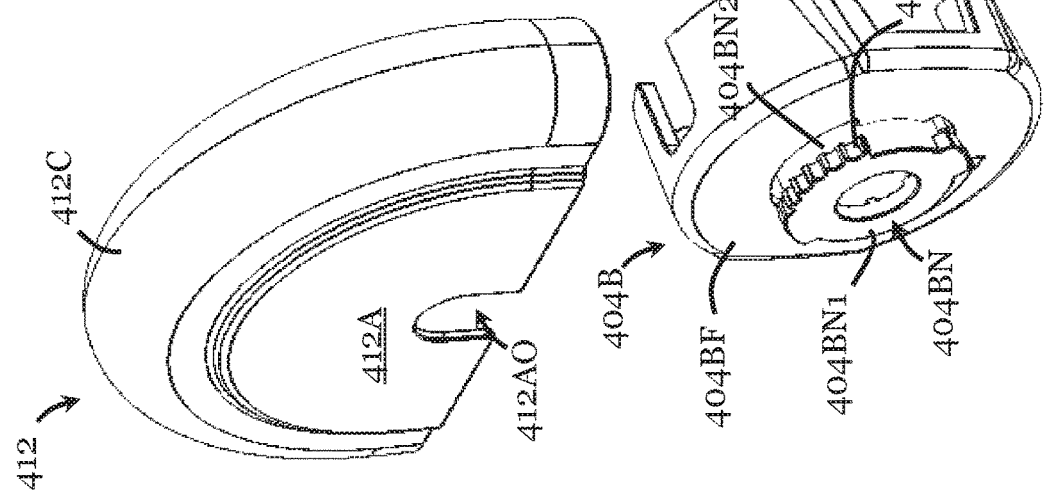
FIG. 13 is an exploded view of the housing part and the blade guard of the edge brush assembly of FIG. 8.

The housing part 404B for mounting the edge brush 402 and the guard 412 of the edge brush assembly 400 are illustrated in FIGS. 13 to 17. As shown in FIGS. 13 and 15, the housing part 404B is in the form of a cap with a mounting neck portion 404BN extending axially and outwardly from an outer face 404BF of the housing 404B. The neck portion 404BN has an axial end face 404BN1 on the side of the edge brush 402 and an outer surrounding wall 404BN2 defining a thickness between the axial end face and the outer face 404BF of the housing 404B along an axial direction. The mounting neck portion 404BN is arranged to removably engage with the guard 412. In this embodiment, the outer wall 404BN2 has a circumferential portion with an array of grooves 404BNG for receiving a locking member of the guard 412. The upper part of the neck portion 404BN defines a first horizontal width W1 traverse to an insertion direction of the guard 412 (see FIG. 16).

Referring now to FIGS. 14 and 15, the guard 412 includes a pocket like configuration shaped like a major segment of a circle. The guard includes two planar faces 412A, 412B connected together by a curved wall 412C. The guard 412 is integrally formed. The planar face 412A of the guard 412 facing away from the housing 404B has a small opening 412AO to allow the hex key head 426 to extend (FIG. 11). The opposite planar face 412B includes a larger opening 412BO, or mouth, for receiving and engaging with the neck portion 404BN of the housing 404B. The guard 412 has a cut out 412BC continuous with the mouth 412BO. A circumferentially extending arm 412BA with a radial nub 412BN at its end is defined by the cut out 412BC. As a result, the arm 412BA is resilient and can move radially towards and away from the mouth 412BO. The mouth 412BO defines a horizontal width W2 smaller than the horizontal width W1 defined by the neck portion 404BN (e.g., the horizontal width W2 of the mouth 412BO is 60% to 99% of the horizontal width W1 of the mounting neck portion 404BN), as shown in FIG. 16.

Figure 17:
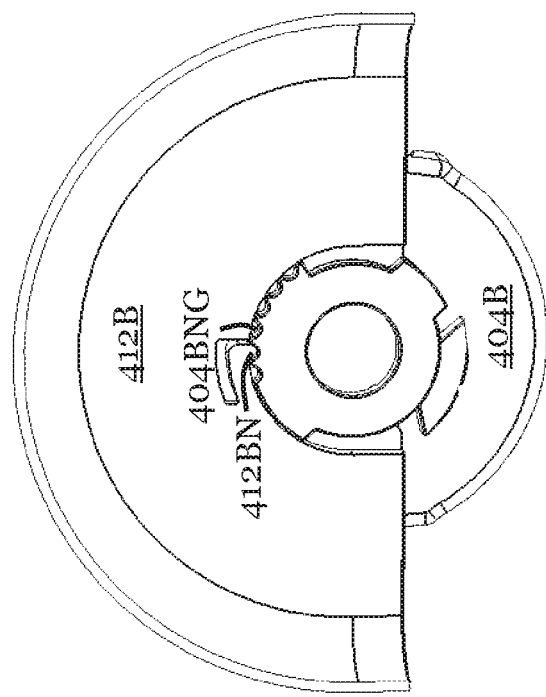
FIG. 17 is a side view of the housing part and the blade guard of FIG. 13, after engagement.
Figure 16:
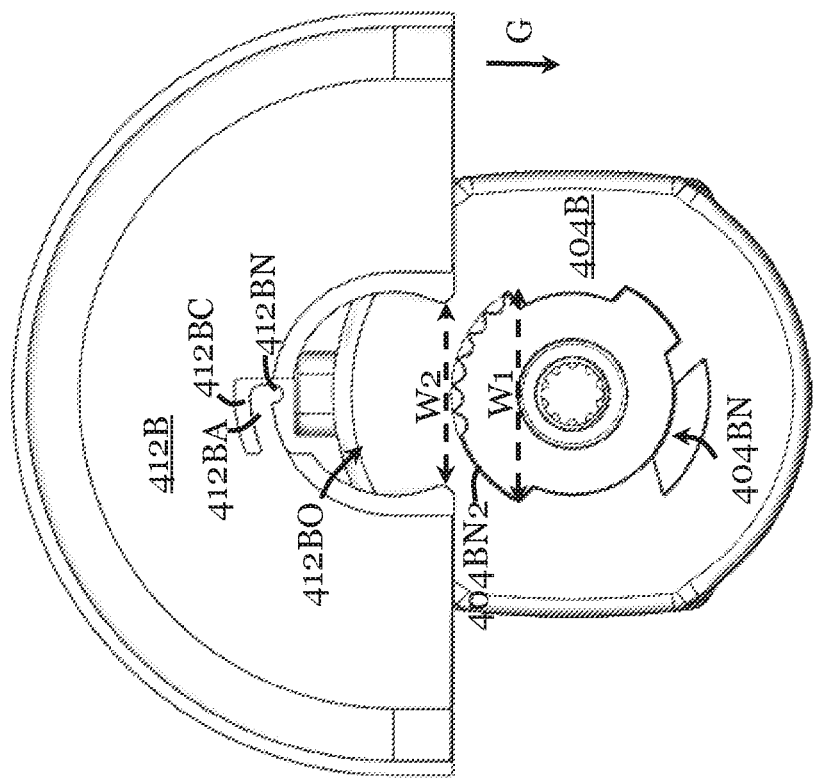
FIG. 16 is a side view of the housing part and the blade guard of FIG. 13, before engagement.

FIGS. 16 and 17 illustrate the mounting of the guard 412 to the housing 404B. To mount the guard 412 to the housing 404B, the user first aligns the mouth 412BO of the guard 412 with the neck portion 404BN of the housing 404B. The user moves the guard 412 or the housing 404B relative to each other along a vertical axis G generally perpendicular to the axis of the spindle 414, to engage the guard 412 and the housing 404B. As the engaging end of the wall of the mouth 412BO contacts the circumferential portion 4049N2 of the neck portion 404BN, the mouth 412BO is expanded by the circumferential portion 404BN2 as the user moves the guard 412 or the housing 404B towards each other. The mouth 412BO expands to an extent that corresponds to the horizontal width W1 of the circumferential portion 4049N2. As the movement continues, the mouth 412BO, owing to the inherent resilience of the associated wall part, clamps onto the mounting neck portion 404BN, as shown in FIG. 17. At the same time, the nub 412BN on the resilient arm 412BA engages in one of the grooves 404BNG in the array. The engagement of the nub 412BN with the groove 404BNG locks a rotation of the guard 412 relative to the housing 404B. If the user wishes to adjust an angle of the guard 412 relative to the housing 404B, the user can simply rotate the guard 412 when it is mounted to the housing 404B. Rotating of the guard 412 in this way would cause the nub 412BN to travel from one groove 404BNG to another groove 404BNG in the array as the nub 412BC travels along the wavy structure defined by the grooves 404BNG.

Figure 19:
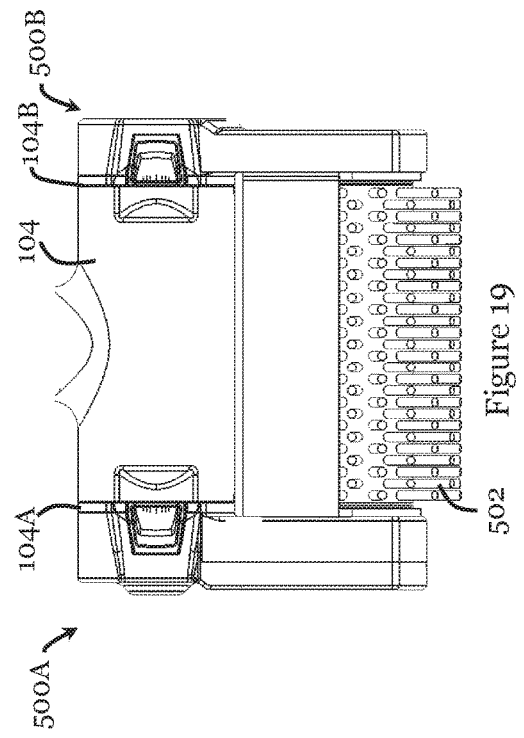
FIG. 19 is a front view of the base part of the outdoor surface treating apparatus of FIG. 18.
Figure 20:
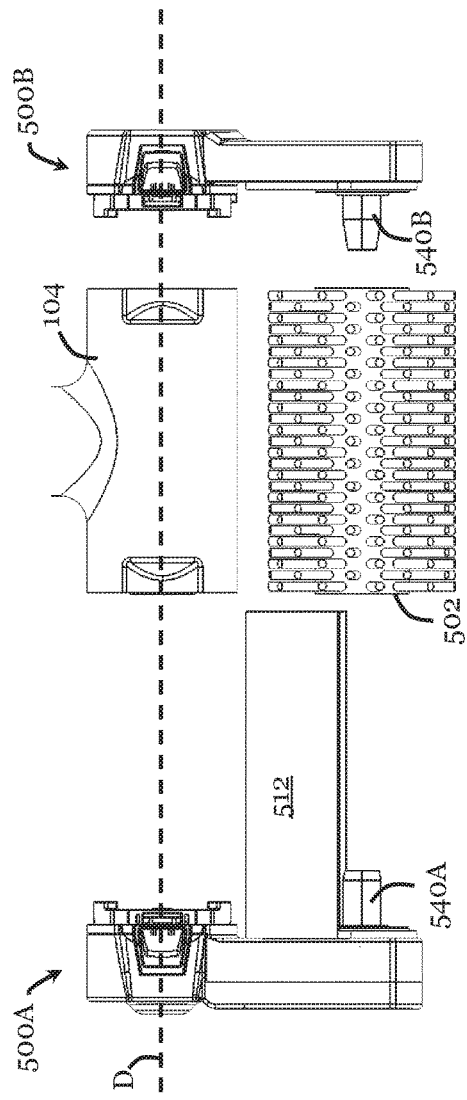
FIG. 20 is an exploded view of the base part of the outdoor surface treating apparatus of FIG. 18.
Figure 18:
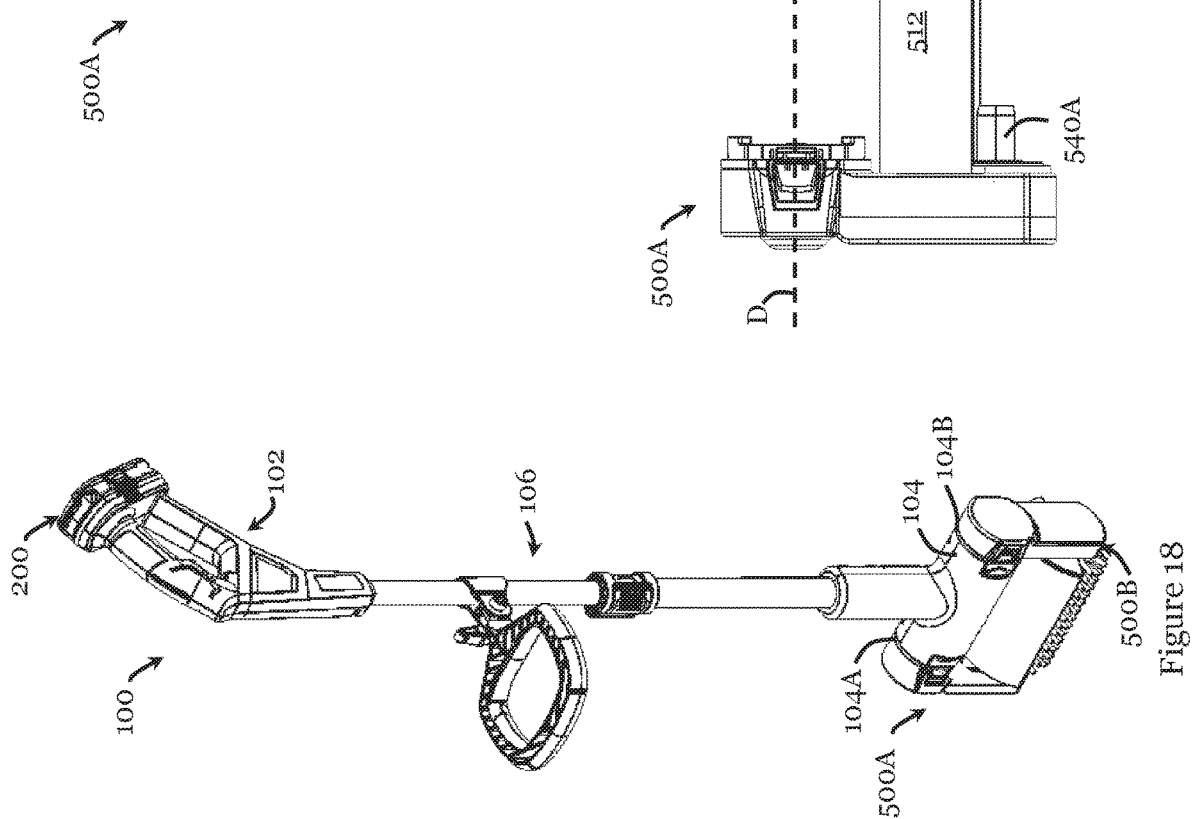
FIG. 18 is a perspective view of the outdoor surface treating apparatus of FIG. 1 in a second configuration (attached with a two-part roller assembly and a battery pack) in one embodiment of the invention.

FIGS. 18 to 20 show the outdoor surface treating apparatus 100 of FIG. 1 with a battery pack 200 attached to the battery receptacle on the base of the handle 102, a two-part roller assembly 500A, 500B attached to the lateral ends 104A, 104B of the head 104. As viewed from the front of the apparatus 100 as shown in FIGS. 19 and 20, a first part 500A of the roller assembly (with roller driving mechanism) is coupled to the left end 104A of the head 104 and a second part 500B of the roller assembly is coupled to the right end 104B of the head 104. To connect the first part 500A of the roller assembly to the head 104, the user simply aligns the corresponding engagement features on the head 104 and the first part 500A of the roller assembly, and then moves the first part 500A of the roller assembly or the head 104 relatively towards each other along the movement axis D such that the engagement features engage. In this embodiment, the movement axis D is generally horizontal. To disconnect the first part 500A of the roller assembly from the head 104, the user simply disengages the engagement features on the head 104 and the first part 500A of the roller assembly, then moves the first part 500A of the roller assembly or the head relatively away from each other along the movement axis D. In this embodiment, the drive unit in the head 104 is arranged to couple with the roller brush 502 of the roller assembly to drive the roller brush 502. As shown in the Figures, a guard 512 is attached to the first part 500A. Both the first and second parts 500A, 500B include a shaft 540A, 540B, extending generally parallel to the axis D and generally tapered towards the roller brush 502, to engage corresponding recesses in the roller brush 502. The roller brush 502 in this embodiment includes radially extending bristles.

Figure 22:
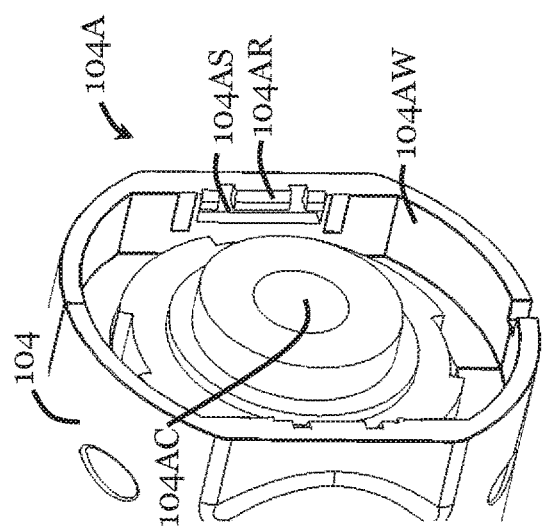
FIG. 22 is a perspective view of a portion of the part of the roller assembly of FIG. 21 and the corresponding lateral end portion of the head of the outdoor surface treating apparatus of FIG. 18.
Figure 22:
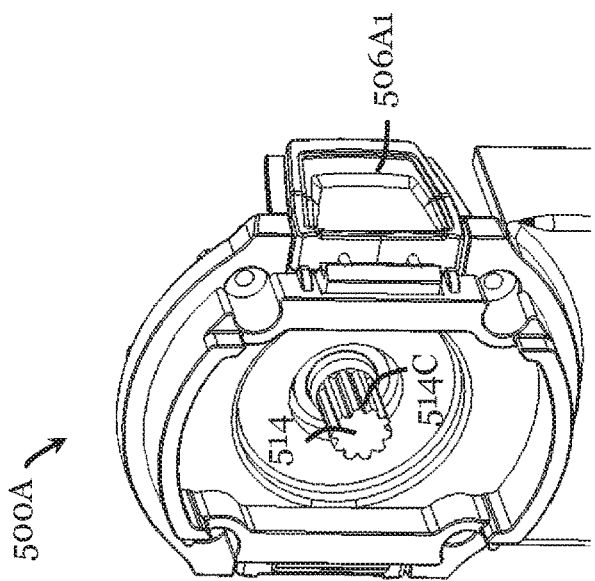
Figure 21:
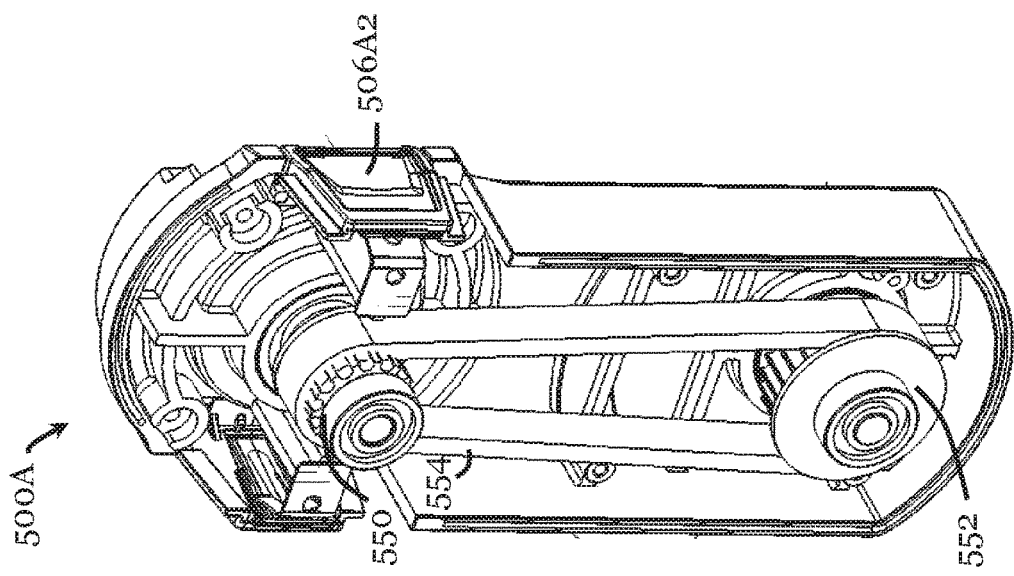
FIG. 21 is a perspective view of an internal construction of one part of the roller assembly (with an end cap removed) of the outdoor surface treating apparatus of FIG. 18.

FIGS. 21 and 22 show the internal construction of the first part 500A of the roller assembly. The first part 500A of the roller assembly includes an upper part with a spindle 514. The spindle 514 has a coupling part 514C arranged to couple with a corresponding coupling part 104AC on the head 104 (FIG. 22). A belt drive mechanism is arranged in the housing of the first part 500A. The belt drive mechanism is formed by the spindle 514, a pulley 550 connected at one end of the spindle, a corresponding pulley 552 at a lower part of the assembly, a drive shaft 540A (see FIG. 20) on which the lower pulley 552 is arranged, and a belt 554 connecting the two pulleys 550, 552. The spindle 514 and the drive shaft 540A extend generally parallel to each other, and horizontally. The belt 554 is a flat belt. The pulleys 550, 552 each include axial ribs. The coupling of the spindle 514 to the drive unit of the head 104 allows the drive unit to drive the spindle 514 and hence the drive shaft 540A through the belt drive 554 for rotating the roller brush 502.

Figure 23:
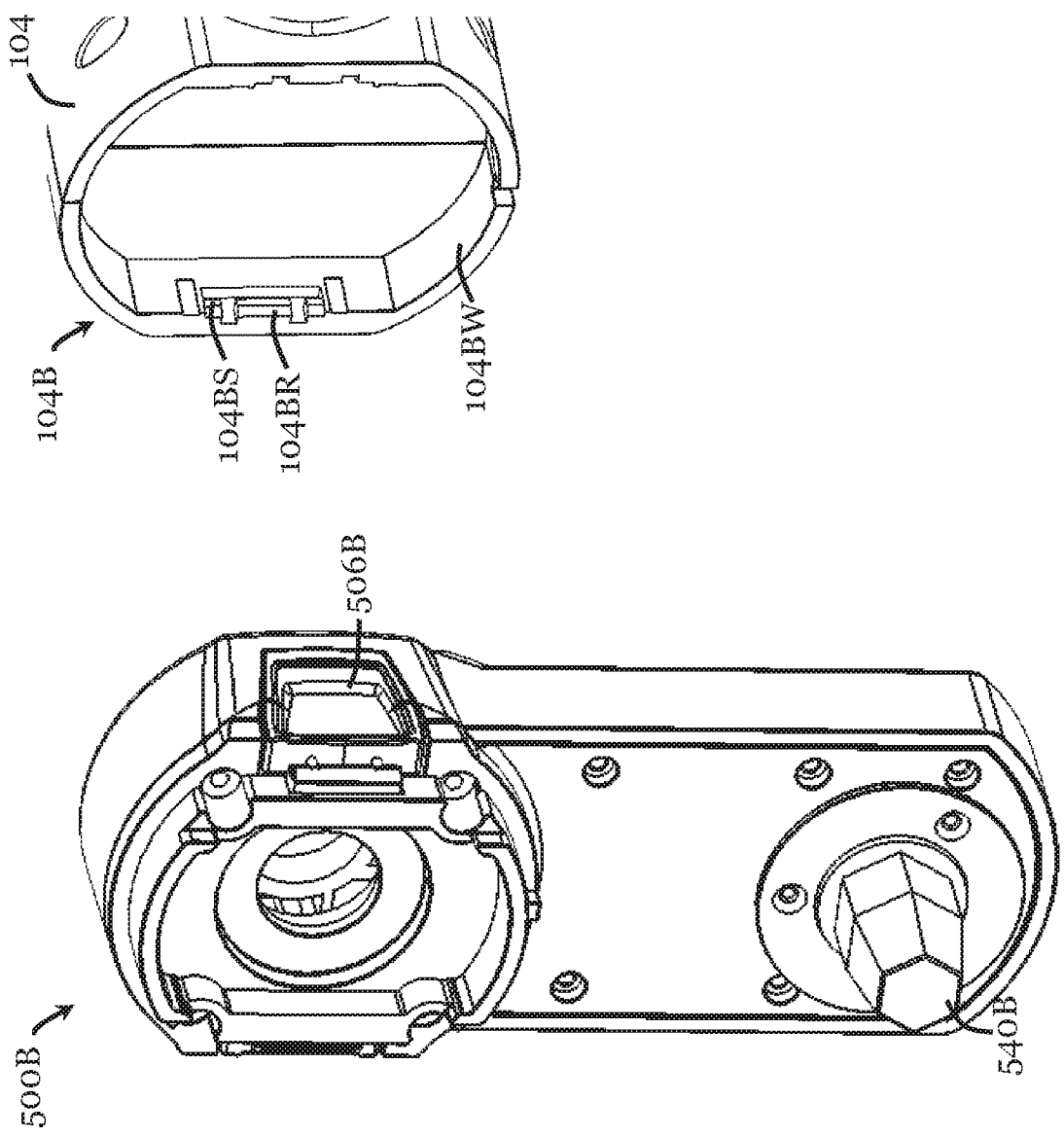
FIG. 23 is a perspective view of another part of the roller assembly of the outdoor surface treating apparatus of FIG. 18 and the corresponding lateral end portion of the head of the outdoor surface treating apparatus of FIG. 18.

FIGS. 22 and 23 respectively show the first part 500A of the roller assembly of FIG. 18 and the corresponding lateral end portion 104A of the head 104, and the second part 500B of the roller assembly of FIG. 18 and the corresponding lateral end portion 104B of the head 104. The engagement mechanism, i.e., the recess in the wall of the head 104 and the spring-biased actuators 506A1, 506A2, 506B in the respective parts 500A, 500B of the roller assembly are similar to the actuators 406 described with respect to FIGS. 7-10. In particular, the lateral end portion 104A of the head 104 for connection with the first part 500A is the lateral end portion 104A of the head 104 for connection with the edge brush assembly 400, and the lateral end portion 104B of the head 104 for connection with the second part 500B is the lateral end portion 104B of the head 104 for connection with the wheel assembly 300.

Figure 25:
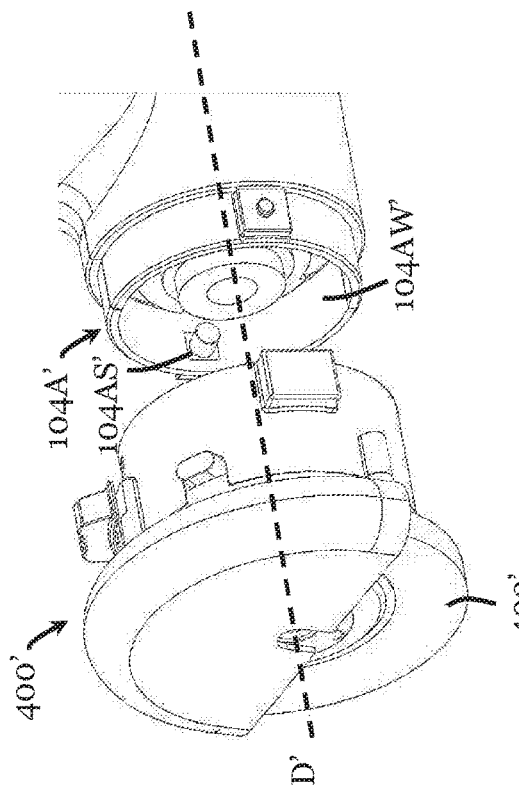
FIG. 25 is another exploded perspective view of a base part of outdoor surface treating apparatus and the edge brush assembly of FIG. 24.
Figure 24:
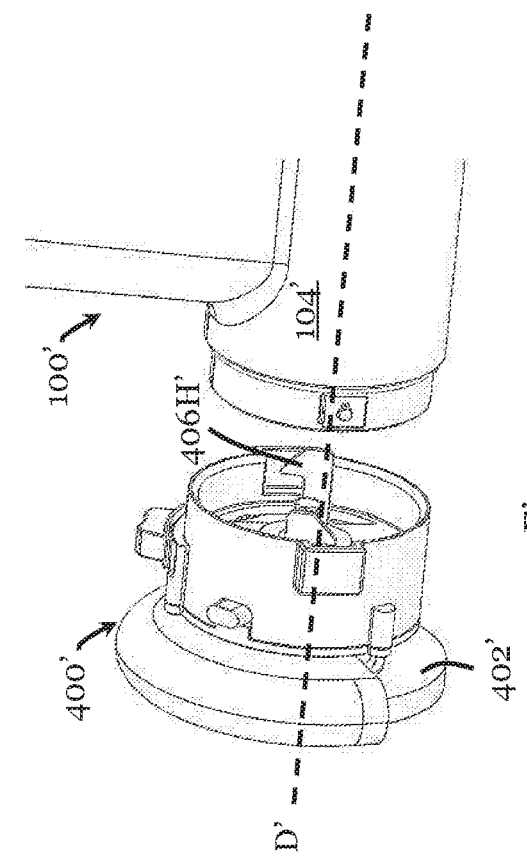
FIG. 24 is an exploded perspective view of a base part of outdoor surface treating apparatus with an edge brush assembly in one embodiment of the invention.

FIGS. 24 and 25 show another outdoor surface treating apparatus 100' in another embodiment for the invention. The outdoor surface treating apparatus 100' is generally the same as the apparatus 100 of FIG. 1, except for the engagement mechanism for releasably engaging the edge brush assembly 400' to the outdoor surface treating apparatus 100'. Also, the coupling part of the assembly 400' and the head 104' is similar to those of FIG. 8.

Figure 27:
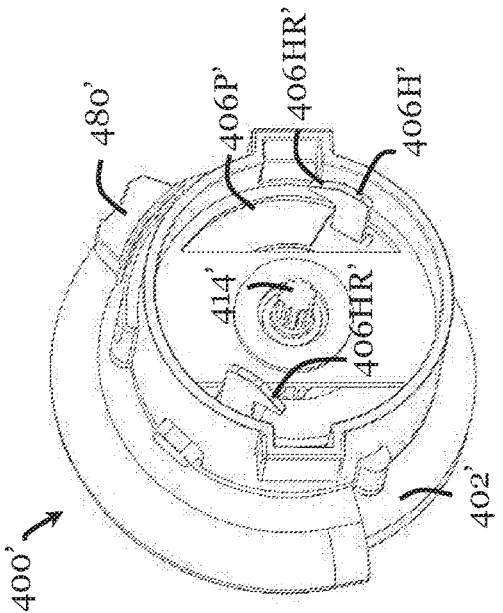
FIG. 27 is a perspective view of the edge brush assembly of FIG. 24, with the engagement hooks at the retracted position.
Figure 26:
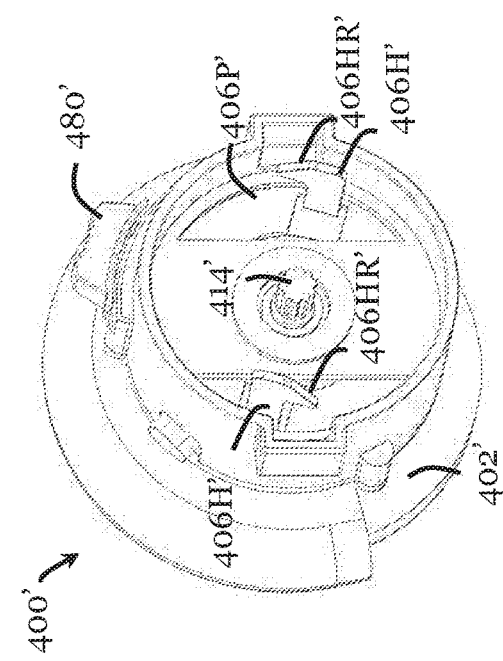
FIG. 26 is a perspective view of the edge brush assembly of FIG. 24, with the engagement hooks at the biased, extended position.

As shown in FIG. 25, the head 104' includes two studs 104AS' extending radially inwardly from the wall 104AW' of the lateral end portion 104A' of the head 104. The studs 104AS' are generally cylindrical and are fixedly connected to the head 104. FIG. 24 shows two corresponding axially extending hooks members 406H' arranged to engage with the studs 104AS'. The hook member 406H' extends axially and generally horizontally away from the edge brush 402'. The hook members 406H' are formed on a plate rotatably biased by a spring 406P'. The hook members 406H' are movable between an angularly extended position biased by the spring and an angularly retracted position when the user applies on the plate a rotational force against the bias of the spring. As illustrated, each hook member 406H' includes, at its engagement edge, a ramp surface 406HR', for sliding over the stud 104AS' as the edge brush assembly 400' engages the head 104'. A user-actuable release member 480' is operably coupled with the hook members 406H'. The user-actuable release member 480' is arranged to be actuated by the user to rotate the plate of the hook members 406H' against the bias of the spring. FIGS. 26 and 27 show the orientation of the hook members 406H' before and after the user-actuable release member 480' is actuated.

In operation, as the edge brush assembly 400' moves along the axis D' towards the head 104' and abuts the engagement end of the head 104', the ramp surfaces 406HR' of the hook members 406H' engage with the studs 104AS', and slide over the cylindrical surface of the studs 104AS' against the bias of the spring. The hook member 406H' continues to move along the surface of the stud 104AS', and upon travelling past the stud 104AS', rotationally recovers and locks with the studs 104AS' under the rotary biasing force exerted by the spring. The engagement of the hooks 406H' and the studs 104AS' allows the edge brush assembly 400' to be engaged with the head 104'. To release the edge brush assembly 400', the user simply rotates the user-actuable release member 480' to move the biased hooks 406H' out of engagement with the studs 104AS', then pulls the edge brush assembly 400' and the head 104' relatively away from each other to disconnect them.

Figure 28:
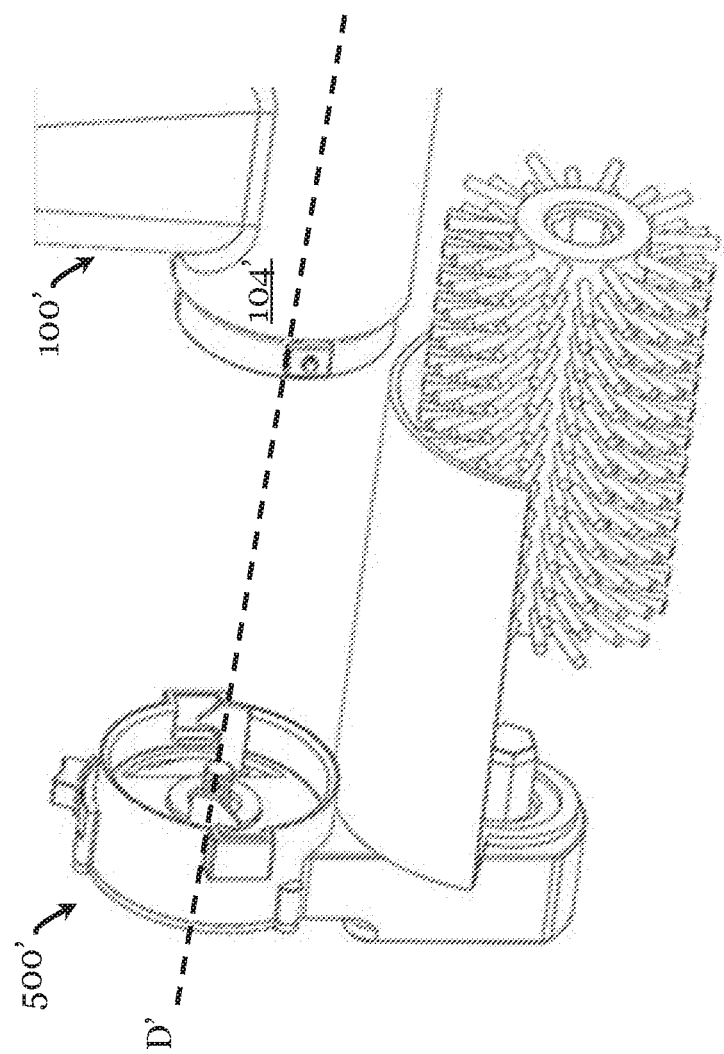
FIG. 28 an exploded perspective view of a base part of outdoor surface treating apparatus with a roller brush assembly in one embodiment of the invention.

FIG. 28 shows the engagement mechanism of FIGS. 24 to 27 applied to a roller assembly 500' similar to that of FIGS. 18 to 20 (the main difference being the engagement mechanism and the release mechanism).

The above embodiments of the outdoor surface treating apparatus and accessory tool assembly are advantageous in that they can be readily attached and detached without having to use a tool such as hex key or wrench. This is particular advantageous for push-behind type apparatus with a rather tall body. To attach the accessory tool assembly, the user can simply manipulate the outdoor surface treating apparatus with one hand and manipulate the accessory tool assembly with another hand, then align them and bring them together to engage the accessory tool assembly to the outdoor surface treating apparatus. In the process, the user does not have to operate any locks or actuators, either on the accessory tool assembly or the apparatus. To detach the accessory tool assembly, the user can simply hold the outdoor surface treating apparatus with one hand and hold the accessory tool assembly with another hand. The user can uses the hand that holds the accessory tool assembly to actuate the release member or the hook member on the accessory tool assembly, then pull and release the accessory tool assembly from the outdoor surface treating apparatus. No specific placement of the apparatus is required. In some embodiments, the guard can be mounted to the accessory tool assembly or the apparatus without having to use a tool. Some embodiments also allow the guard to be adjusted, again without having to use a tool. These arrangements further improve ease of use of the apparatus. The engagement mechanism for the accessory tool assembly and the head of the apparatus may provide a click sound (by material contact) to indicate that the engagement is successful. Likewise, the engagement and rotation mechanism for the guard can also provide click sounds to indicate movement.

The above embodiments of the outdoor surface treating apparatus and accessory tool assembly also enable the apparatus to be readily converted for a different application, or enable the apparatus to be readily replaced with a new tool assembly when the tool assembly malfunctions or becomes damaged. Versatility of the apparatus as well as maintenance cost-effectiveness and efficiency can be improved. In the embodiments where a battery receptacle is arranged at the base of the handle, i.e., at a rearwardly extending top end of the apparatus, when the user operates the apparatus by tilting the apparatus backwards and pushes it along the surface, a moment is applied to the apparatus to propel the apparatus to move forward (by rotating the rotatable tool element such as the wheel, the roller, etc. of the accessory tool assembly).

It will be appreciated by persons skilled in the art that numerous variations and/or modifications may be made to the invention as shown in the specific embodiments without departing from the scope of invention defined by the claims. In particular, so long as bounded by the claims, features disclosed in one embodiment can be selectively applied to another embodiment to provide new embodiments; features from different embodiments can be combined to form new embodiments; one or more features from the same embodiment can be replaced or removed to provide new embodiments. The described embodiments of the invention should be considered in all respects as illustrative, not restrictive.

For example, the outdoor surface treating apparatus can be electrically powered or can be a mechanical device that does not require electric power to operate. The apparatus is preferably a cordless DC electric apparatus but it may alternatively be a corded AC electric apparatus or a hybrid AC-DC electric apparatus. The apparatus can be operated with any number of battery packs. In one example, the apparatus is operated with an 18V Lithium-based battery pack. The outdoor surface treating apparatus can take different shape and form. For example, the outdoor surface treating apparatus may include any number of handles. The battery receptacle may be arranged away from the handle, e.g., on the head. The connection tube assembly between the handle and the head need not be adjustable. The handle need not be arranged at the top-most end of the body, and need not extend rearwardly. The auxiliary handle may be fixedly connected to (not adjustable with respect to) the tube assembly, or may even be omitted. The drive unit may include any types of prime movers, preferably a motor, and optionally with one or more gear transmission unit, coupled with the coupling member for coupling with the corresponding coupling member on the accessory tool assembly. The motor can be oriented differently, e.g., with the motor shaft extending at an angle to horizontal or even vertically. The coupling between the drive unit and the coupling part of the accessory tool assembly can be any members or parts that are arranged to establish mechanical connection. Optionally, electrical connection may also be established as the mechanical connection is established. The head could include any number of engagement mechanisms each arranged to engage with a corresponding accessory tool assembly. The movement axis for engaging the accessory tool assembly with the outdoor surface treating apparatus can be a horizontal axis (attaches and detaches from the sides), a vertical axis (attaches and detaches from the bottom), or any other axis.

The accessory tool assembly for the outdoor surface treating apparatus can be any tool module arranged to interact with the outdoor surface to be or being cleaned. In other words, the engagement and coupling mechanisms may be provided on other types of accessory toll assembly. The shape and form of the accessory tool assembly may vary. The number of actuators and engagement features can be any number, preferably less than four. The roller, the edge brush, the edge cutter, or the wheel may have different shape and form. For example, the roller can include any bristles arrangement. The bristles are preferably but not necessarily stiff. The roller bristles can be homogeneous or non-homogeneous. In some examples, it is advantageous to include bristles with different lengths and/or hardness, for example, alternatively along one or both of the circumferential surface or the long axis of the roller, to provide an improved cleaning effect. The edge brush may be a wire brush. The edge cutter may be a disc-like blade. The accessory tool assembly may or may not include a guard. In the examples with a guard, the guard can take appropriate shape and form to be a guard for an edge cutter, a guard for an edge brush, a guard for the roller, etc. The shape and form of the guard may vary but the guard can generally be any types of cover that at least partly surrounds the tool element, e.g., brush or cutter, to shield, from the user, the tool element as well as the materials on the surface agitated by the tool element. The mounting mechanism and rotation mechanism of the guard disclosed with respect to the edge brush assembly can equally be applied to other accessory tool assemblies.

The invention claimed is:

1. An outdoor surface treating apparatus, comprising:
a body having a handle, a head, and an elongated tube assembly arranged between the handle and the head, wherein the head is arranged to be removably connected with an accessory tool assembly, the head including a first engagement arrangement for releasably engaging with a second engagement arrangement in the accessory tool assembly; and
a drive unit arranged in the head, the drive unit including a first coupling member for drivingly coupling with a second coupling member in the accessory tool assembly; wherein:
the first engagement arrangement is fixed;
the second engagement arrangement is movable between an extended position and a retracted position and the accessory tool assembly includes a spring plate for biasing the second engagement arrangement into the extended position; and
as the accessory tool assembly is aligned with the head and is moved along a movement axis into engagement with the head, the second engagement arrangement first moves over the first engagement arrangement against the bias of the spring plate into the retracted position and then returns to the extended position and locks with the first engagement arrangement while the first coupling member couples with the second coupling member.

2. The outdoor surface treating apparatus of claim 1, wherein the accessory tool assembly is any one of:
a roller assembly having a roller with bristles arranged to be driven by the drive unit;
an edge cutter assembly with an edge cutter arranged to be driven by the drive unit; or
an edge brush assembly with an edge brush arranged to be driven by the drive unit.

3. The outdoor surface treating apparatus of claim 1, wherein the head includes a long axis generally parallel to the movement axis; and the first engagement arrangement is arranged at a lateral end portion of the head.

4. The outdoor surface treating apparatus of claim 1, wherein the second engagement arrangement is movable radially with respect to the movement axis between the extended position and the retracted position.

5. The outdoor surface treating apparatus of claim 1, wherein the second engagement arrangement is rotatable between the extended position and the retracted position.

6. The outdoor surface treating apparatus of claim 1, wherein the handle includes a generally rearwardly extending hand grip portion and a base arranged at a rear end of the hand grip portion, and wherein a battery receptacle for receiving a battery pack is arranged at the base.

7. The outdoor surface treating apparatus of claim 4, wherein the first engagement arrangement includes a recess defined by a wall part in a lateral end portion of the head; and the second engagement arrangement includes a corresponding hook member arranged to be received in the recess.

8. The outdoor surface treating apparatus of claim 4, wherein the first engagement arrangement includes two recesses defined in a lateral end portion of the head; and the second engagement arrangement includes two corresponding hook members each arranged to be received in a respective recess.

9. The outdoor surface treating apparatus of claim 7, wherein at least one of a front end of the wall part or a front end of the hook member includes a ramp surface to facilitate radial movement of the hook member relative to the wall part as the accessory tool assembly is aligned with the head and is moved along the movement axis into engagement with the head.

10. The outdoor surface treating apparatus of claim 7, wherein the hook member is actuable by a user to move the hook member into the retracted position to release the engagement of the recess and the hook member.

11. The outdoor surface treating apparatus of claim 8, wherein the two recesses are diametrically opposed to each other and the two corresponding hook members are correspondingly diametrically opposed to each other.

12. The outdoor surface treating apparatus of claim 8, wherein at least one of a front end of the wall part or a front end of the hook member includes a ramp surface to facilitate radial movement of the hook member relative to the wall part as the accessory tool assembly is aligned with the head and is moved along the movement axis into engagement with the head.

13. The outdoor surface treating apparatus of claim 8, wherein each hook member is actuable by a user to move the hook member into the retracted position to release the engagement of the recess and the hook member.

14. The outdoor surface treating apparatus of claim 5, wherein the first engagement arrangement includes a stud formed or arranged on a wall part in a lateral end portion of the head and the second engagement arrangement includes a corresponding hook member arranged to engage with the stud.

15. The outdoor surface treating apparatus of claim 5, wherein the first engagement arrangement includes two studs formed or arranged on a lateral end portion of the head and the second engagement arrangement includes two corresponding hook members each arranged to engage with a respective stud.

16. The outdoor surface treating apparatus of claim 14, wherein a front end of the hook member includes a ramp surface to facilitate rotation of the hook member relative to the stud as the accessory tool assembly is aligned with the head and is moved along the movement axis into engagement with the head.

17. The outdoor surface treating apparatus of claim 14, wherein the accessory tool assembly further includes a user-actuable release member operably coupled with the hook member, and the user-actuable release member is arranged to be actuated to rotate the hook member into the retracted position to release the engagement of the stud and the hook member.

18. The outdoor surface treating apparatus of claim 15, wherein the two studs are diametrically opposed to each other and the two corresponding hook members are correspondingly diametrically opposed to each other.

19. The outdoor surface treating apparatus of claim 17, wherein the user-actuable release member is rotatable by the user to release the engagement of the stud and the hook member.

20. An accessory tool assembly for an outdoor surface treating apparatus, comprising:
a first coupling member for drivingly coupling with a tool element and a second coupling member of a drive unit of the outdoor surface treating apparatus so as to drivingly couple the tool element with the drive unit;
a first engagement arrangement for releasably engaging with a second engagement arrangement in a head of an outdoor surface treating apparatus, wherein:
the first engagement arrangement is movable radially with respect to a movement axis between an extended position and a retracted position and includes a hook member arranged to be received in a corresponding recess in the second engagement arrangement in the head; and the accessory tool assembly includes at least one spring-biased actuator comprising an actuation portion and the hook member to be received in the recess, wherein the at least one actuation portion is movable radially between an extended position as biased by a spring plate and a retracted position when the bias of the spring plate is overcome by a force applied by the user;
the second engagement arrangement is fixed and includes the recess for receiving the hook member, wherein the recess is defined by a wall part in a lateral end portion of the head; and
as the accessory tool assembly is aligned with the head and is moved along the movement axis into engagement with the head, the first engagement arrangement first moves over the second engagement arrangement against the bias of the spring plate then returns to the extended position and locks with the second engagement while the first coupling member couples with the second coupling member.

* * * * *